US012686474B2

(12) United States Patent
Kim

(10) Patent No.: US 12,686,474 B2
(45) Date of Patent: Jul. 21, 2026

(54) FLOATABLE CONCRETE BLOCK STRUCTURE AND METHOD FOR MANUFACTURING SAME

(71) Applicant: Sangki Kim, Busan (KR)

(72) Inventor: Sangki Kim, Busan (KR)

( * ) Notice: Subject to any disclaimer, the term of this patent is extended or adjusted under 35 U.S.C. 154(b) by 496 days.

(21) Appl. No.: 18/235,198

(22) Filed: Aug. 17, 2023

(65) Prior Publication Data

US 2023/0391429 A1     Dec. 7, 2023

Related U.S. Application Data

(63) Continuation of application No. PCT/KR2022/002174, filed on Feb. 15, 2022.

(30) Foreign Application Priority Data

Feb. 26, 2021    (KR) ........................ 10-2021-0026047
Jun. 1, 2021     (KR) ........................ 10-2021-0070612

(51) Int. Cl.
| | |
|---|---|
| *B63B 75/00* | (2020.01) |
| *B63B 5/14* | (2006.01) |
| *B63B 5/20* | (2006.01) |
| *B63B 35/44* | (2006.01) |
| *B63B 43/04* | (2006.01) |
(Continued)

(52) U.S. Cl.
CPC ................ *B63B 75/00* (2020.01); *B63B 5/14* (2013.01); *B63B 5/20* (2013.01); *B63B 35/44* (2013.01); *B63B 43/04* (2013.01); *B63B 2035/446* (2013.01); *F03D 13/256* (2023.08); *F05B 2240/93* (2013.01); *F05B 2240/95* (2013.01); *F16J 15/02* (2013.01)

(58) Field of Classification Search
CPC .. B63B 75/00; B63B 5/00; B63B 5/14; B63B 5/20; B63B 35/00; B63B 35/38; B63B 35/44; B63B 43/00; B63B 43/04; B63B 3/00; B63B 3/08; E02B 3/00; E02B 3/06; E02D 15/00; E02D 25/00
USPC ................................ 114/56.1, 263, 266, 267
See application file for complete search history.

(56) References Cited

U.S. PATENT DOCUMENTS 7,373,892 B2 *    5/2008    Veazey ................... B63B 35/44
114/77 R
2016/0025074 A1    1/2016    Sato et al.

FOREIGN PATENT DOCUMENTS

| JP | 2003-342935 A | 12/2003 |
|---|---|---|
| JP | 5022797 B2 | 9/2012 |
| JP | 5330048 B2 | 10/2013 |
(Continued)

OTHER PUBLICATIONS

International Search Report for PCT/KR2022/002174 mailed May 16, 2022 from Korean Intellectual Property Office.

*Primary Examiner* — Lars A Olson
(74) *Attorney, Agent, or Firm* — Paratus Law Group, PLLC

(57) ABSTRACT

A floatable concrete block structure is manufactured by fabricating individual concrete blocks on land, and then assembling and coupling the individual concrete blocks underwater or on a water surface. An assembly buoyancy chamber is formed inside by the first concrete block and the second concrete block, the inflow of water into the assembly buoyancy chamber is prevented by a first watertight packing, and so on, and the first concrete block and the second concrete block are coupled to each other by concrete columns.

4 Claims, 44 Drawing Sheets

(51)  Int. Cl.
*F03D 13/25*          (2016.01)
*F16J 15/02*          (2006.01)

(56)                   References Cited

FOREIGN PATENT DOCUMENTS

| KR | 10-0903987 B1 | 6/2009 |
| KR | 10-2011-0116262 A | 10/2011 |
| KR | 10-1355805 B1 | 1/2014 |
| KR | 10-2022339 B1 | 9/2019 |
| WO | WO 2020-166846 A1 | 8/2020 |

* cited by examiner

FLOATABLE CONCRETE BLOCK STRUCTURE AND METHOD FOR MANUFACTURING SAME

CROSS-REFERENCE TO PRIOR APPLICATIONS

This application is a Continuation Application of PCT International Application No. PCT/KR2022/002174 (filed on Feb. 15, 2022), which claims priority to Korea Patent Application Nos. 10-2021-0026047 (filed on Feb. 26, 2021) and 10-2021-0070612 (filed on Jun. 1, 2021), which are all hereby incorporated by reference in their entirety.

BACKGROUND

The present disclosure relates to a floatable concrete block structure which is manufactured to be able to float on a water surface, to be submerged in water after floating on the water surface, or to be refloated on the water surface after being submerged in the water, and a method of manufacturing the same.

In a situation in which interest in natural resources is increasing, wind power generation for generating electric power by using wind is recognized as an alternative energy source. The wind power generation is a method of generating electric power by using a wind turbine, and it is preferable to install the wind turbine in a place in which air flow is not blocked.

A conventional wind turbine installed on land is often installed in a mountain or highland on which air flow can be secured as much as possible, but has limitations in effectively producing energy due to obstacles such as hills, forests, and buildings.

In recent years, attempts have been actively made to install a wind turbine on the sea without the aforementioned obstacles, but there has been limitation that a wind power structure is installed only in the sea with a depth of 25 m or less due to the installation of a foundation structure to support the wind turbine.

Meanwhile, since most offshore wind resources are generated at a location of a depth of 50 m or more, there is a limit to securing satisfactory energy by installing wind power generation structures only on the coast.

Accordingly, recently, active attempts have been made to install a wind power generation structure in the ocean with a depth of 50 m or more. As such attempts, with an offshore oil and gas production platform as a motif, a semi-submersible offshore wind power generation platform using steel materials that can be applied to the ocean is being installed.

However, in the case of using steel, there are problems in that the platform is high in price and is vulnerable to corrosion due to seawater containing salt, and is vulnerable to hoop stress caused by the pressure of seawater.

Meanwhile, a document of a prior art related to the semi-submersible offshore wind power generation platform is proposed in Japanese Patent No. 5022797 (filed on Jul. 11, 2007, and registered on Jun. 22, 2012).

According to the document of the prior art, a floating body is made of concrete in order to overcome the problem of the durability of steel materials.

In addition to the above purposes, a marine concrete structure is manufactured and used for various purposes.

The marine concrete structure may be a concrete structure that floats on a water surface, such as a platform for wind power generation, or a concrete structure that is submerged in water for the purpose of a breakwater or anchor.

In general, a large-scale concrete structure is manufactured in a caisson structure.

When a large concrete structure is manufactured on land, it is very difficult to move the concrete structure manufactured on land to the sea due to weight thereof.

As a technology to solve this problem, a method of manufacturing a floatable large concrete structure on a large barge has recently been used, but in this case, the manufacturing of the concrete structure on the barge is inconvenient and is evaluated as difficult to be commercialized due to the problem of having to use the expensive large barge for a very long time.

SUMMARY

The present disclosure has been made to solve the above problems occurring in the prior art and is intended to propose a concrete block structure which has no need to use a large barge and can be used by assembling and coupling individual concrete blocks underwater or on a water surface after fabricating the individual concrete blocks on land, and a method of manufacturing the same.

In order to accomplish the above objectives, a method of manufacturing a floatable concrete block structure of the present disclosure includes: a first concrete block fabrication step of fabricating a first concrete block comprising a first concrete block body in which a buoyancy-chamber bottom surface is formed on an upper surface thereof, and a first watertight packing disposed on the upper surface of the first concrete block body in a form surrounding the buoyancy-chamber bottom surface; a second concrete block fabrication step of fabricating a second concrete block comprising a second concrete block body in which a second buoyancy chamber having an open lower surface and a plurality of second column through holes extending vertically are formed; a first concrete block installation step of installing the first concrete block by submerging the first concrete block in water after the first concrete block fabrication step; a second concrete block installation step of installing the second concrete block such that a concrete block assembly is formed by installing the second concrete block on the first concrete block after the second concrete block fabrication step and the first concrete block installation step, an assembly buoyancy chamber having a closed lower end is formed in the concrete block assembly by the second buoyancy chamber of the second concrete block and the buoyancy-chamber bottom surface of the first concrete block, and the first watertight packing is located between the first concrete block and the second concrete block and prevents water from being introduced into the assembly buoyancy chamber from the outside; a concrete column formation step of forming concrete columns coupling the first concrete block and the second concrete block to each other along each of the second column through holes after the second concrete block installation step so as to form a concrete block structure having the first concrete block and the second concrete block coupled to each other by the concrete columns; and an assembly buoyancy chamber drainage step of draining water contained in the assembly buoyancy chamber after the concrete column formation step so that the concrete block structure is floated to a water surface by the buoyancy of the assembly buoyancy chamber.

In the above, the first concrete block may comprise a plurality of column rebar assemblies, each of which extends vertically upward from a lower end part thereof connected to the inside of the first concrete block body and protrudes upward from the upper surface of the first concrete block body; at the second concrete block installation step, the second concrete block may be installed on the first concrete block so that the column rebar assembly of the first concrete block is inserted into the second column through hole of the second concrete block, and concrete-column through holes having a closed lower end may be formed in the concrete block assembly by the second column through holes of the second concrete block and the first concrete block; a column drainage step of removing water contained inside the concrete-column through hole after the second concrete block installation step may be comprised; and at the concrete column formation step, by pouring concrete into the concrete-column through holes after the column drainage step, the concrete columns having the column rebar assembly and the poured concrete integrated with each other may be formed.

A method of manufacturing a floatable concrete block structure according to another aspect of the present disclosure includes: a first concrete block fabrication step of fabricating a first concrete block comprising a first concrete block body having a first buoyancy chamber with an open upper surface formed in an upper part thereof, and a first watertight packing disposed on an upper surface of the first concrete block body in a form surrounding the first buoyancy chamber; a second concrete block fabrication step of fabricating a second concrete block comprising a second concrete block body in which a second buoyancy chamber having an open lower surface and a plurality of second column through holes extending vertically are formed; a first concrete block flotation step of floating the first concrete block on a water surface after the first concrete block fabrication step; a second concrete block installation step of installing the second concrete block on the first concrete block floating on the water surface after the second concrete block fabrication step and the first concrete block flotation step so as to form a concrete block assembly, wherein an assembly buoyancy chamber which is formed by the second buoyancy chamber of the second concrete block and the first buoyancy chamber of the first concrete block communicating with the second buoyancy chamber and has a closed lower end is formed in the concrete block assembly, and the first watertight packing is located between the first concrete block and the second concrete block so that water is prevented from being introduced into the assembly buoyancy chamber from the outside; and a concrete column formation step of forming concrete columns coupling the first concrete block and the second concrete block to each other along each of the second column through holes after the second concrete block installation step so as to form a concrete block structure having the first concrete block and the second concrete block coupled to each other by the concrete columns.

In the above, the first concrete block may comprise a plurality of column rebar assemblies, each of which extends vertically upward from a lower end part thereof connected to the inside of the first concrete block body and protrudes upward from the upper surface of the first concrete block body; at the second concrete block installation step, the second concrete block may be installed on the first concrete block so that the column rebar assembly of the first concrete block is inserted into the second column through hole of the second concrete block, and concrete-column through holes having a closed lower end may be formed in the concrete block assembly by the second column through holes of the second concrete block and the first concrete block; and at the concrete column formation step, by pouring concrete into the concrete-column through holes, the concrete columns having the column rebar assembly and the poured concrete integrated with each other may be formed.

In the above, the first concrete block body may comprise a plurality of first temporary coupling bolts, each of which extends vertically upward from a lower end part thereof connected to the inside of the first concrete block body and protrudes upward from the upper surface of the first concrete block body, the first temporary coupling bolts being disposed in a form surrounding the first buoyancy chamber; the second concrete block body may have a plurality of second bolt connection spaces, each of which comprises a second bolt through hole extending vertically and a second nut seating recess which is formed on the second bolt through hole and has a cross-sectional area larger than a cross-sectional area of the second bolt through hole; and at the second concrete block installation step, the first temporary coupling bolt of the first concrete block may be inserted into the second bolt connection space of the second concrete block, and a nut may be located in the second nut seating recess while being fastened to the first temporary coupling bolt so that the second concrete block is temporarily coupled to the first concrete block.

In the above, at the first concrete block flotation step, a plurality of first concrete blocks may be continuously disposed horizontally; and at the second concrete block installation step, a plurality of second concrete blocks may be continuously disposed horizontally and there may be multiple second concrete blocks which are continuously disposed horizontally on one first concrete block.

The above two methods of manufacturing a floatable concrete block structure may include the following additional features.

The second buoyancy chamber may extend vertically and have open upper and lower surfaces; a third concrete block fabrication step of fabricating a third concrete block comprising a third concrete block body which has a plurality of third column through holes extending vertically and has a buoyancy chamber ceiling surface formed on a lower surface of the third concrete block body so as to cover an upper side of the second buoyancy chamber may be comprised; a third concrete block installation step of installing the third concrete block on the second concrete block after the second concrete block installation step and the third concrete block fabrication step may be comprised; and at the concrete column formation step, each of the concrete columns may be formed along each of the second column through holes and each of the third column through holes so as to form the concrete block structure having the first concrete block, the second concrete block, and the third concrete block coupled to each other by the concrete columns.

The second buoyancy chamber may extend vertically and have open upper and lower surfaces; and a cap concrete formation step of forming a cap concrete on the second concrete block so as to cover an upper side of the assembly buoyancy chamber after the concrete column formation step may be comprised.

The second buoyancy chamber may extend vertically and have open upper and lower surfaces; the second concrete block may be provided with a second watertight packing disposed on an upper surface of the second concrete block body in a form surrounding the second buoyancy chamber; and at the second concrete block installation step, a plurality of second concrete blocks may be installed in multiple layers on the first concrete block, and the second watertight packing may be located between the second concrete blocks installed to be vertically adjacent to each other so that water is prevented from being introduced into the assembly buoyancy chamber from the outside.

A floatable concrete block structure manufactured according to the present disclosure comprises: a concrete block assembly comprising: a first concrete block having a first concrete block body in which a buoyancy-chamber bottom surface is formed on an upper surface thereof; a second concrete block which comprises a second concrete block body having a second buoyancy chamber with an open lower surface for forming an assembly buoyancy chamber with a closed lower end in cooperation with the buoyancy-chamber bottom surface of the first concrete block and having a plurality of second column through holes extending vertically and is installed on the first concrete block; and a first watertight packing which is located between the first concrete block and the second concrete block and prevents water from being introduced into the assembly buoyancy chamber from the outside; and concrete columns each of which is formed along each of the second column through holes to couple the first concrete block and the second concrete block to each other.

In the above, a first buoyancy chamber having an open upper surface may be formed in an upper part of the first concrete block body, and the first buoyancy chamber may comprise the buoyancy-chamber bottom surface and form the assembly buoyancy chamber together with the second buoyancy chamber.

In the above, the first concrete block may comprise a plurality of column rebar assemblies, each of which extends vertically upward from a lower end part thereof connected to the inside of the first concrete block body and protrudes upward from the upper surface of the first concrete block body, the column rebar assembly may be inserted into the second column through hole of the second concrete block, concrete-column through holes having a closed lower end may be formed in the concrete block assembly by the second column through holes of the second concrete block and the first concrete block, and the concrete columns may be formed in such a manner that concrete poured into the concrete-column through hole is integrated with the column rebar assembly.

In the above, the first watertight packing may comprise a first inner watertight packing surrounding the assembly buoyancy chamber and a first outer watertight packing which is located outside the first inner watertight packing and surrounds the first inner watertight packing, and the plurality of column rebar assemblies may be located between the first inner watertight packing and the first outer watertight packing.

In the above, the second buoyancy chamber may extend vertically and have open upper and lower surfaces, the concrete block assembly may comprise a third concrete block which comprises a third concrete block body having a plurality of third column through holes extending vertically and covering an upper side of the assembly buoyancy chamber, and is installed on the second concrete block, and each of the concrete columns may be formed along each of the second column through holes and each of the third column through holes so as to couple the first concrete block, the second concrete block, and the third concrete block to each other.

In the above, the second buoyancy chamber may extend vertically and have open upper and lower surfaces, and a cap concrete formed on the second concrete block for covering an upper side of the assembly buoyancy chamber may be comprised.

In the above, the second buoyancy chamber may extend vertically and have open upper and lower surfaces, the second concrete blocks may be installed in multiple layers on the first concrete block, and the concrete block assembly may comprise a second watertight packing which is located between the second concrete blocks installed to be vertically adjacent to each other and prevents water from being introduced into the assembly buoyancy chamber from the outside.

In the above, first column space parts may be formed in the first concrete block body so as to form the concrete columns, and each of the concrete columns may be formed along each of the first column space parts and each of the second column through holes so as to couple the first concrete block and the second concrete block to each other.

In the above, the second buoyancy chamber may extend vertically and have open upper and lower surfaces, a third concrete block or a cap concrete may be provided on the second concrete block so as to cover an upper side of the assembly buoyancy chamber, and a buoyancy control device discharging water in the assembly buoyancy chamber to the outside or introducing water into the assembly buoyancy chamber so as to control the buoyancy of the assembly buoyancy chamber may be provided.

In the above, the assembly buoyancy chamber may be capable of being used as a space in which a filling material is filled.

As described above, the present disclosure does not require the use of a large barge and can be transported by land due to the shapes of blocks which can be assembled with each other, so the manufacturing cost of a marine concrete structure is greatly reduced compared to a conventional method.

In addition, since most of manufacturing work of the concrete block structure is performed underwater or on a water surface, a large site required for manufacturing large concrete blocks on land is unnecessary.

Furthermore, the concrete block structure manufactured according to the present disclosure may be used in a floating state on a water surface, be moved while floating, be used after being moved and submerged, or be moved freely after being submerged and floated again.

BRIEF DESCRIPTION OF THE DRAWINGS

FIG. 14 is a view illustrating how the concrete block structure according to the first embodiment of the present disclosure is used differently.

FIGS. 27 to 34 are views sequentially illustrating the method of manufacturing the floatable concrete block structure according to the second embodiment of the present disclosure.

FIG. 48 is a conceptual sectional view of a floatable concrete block structure according to a fourth embodiment of the present disclosure.

DETAILED DESCRIPTION

Figure 1:
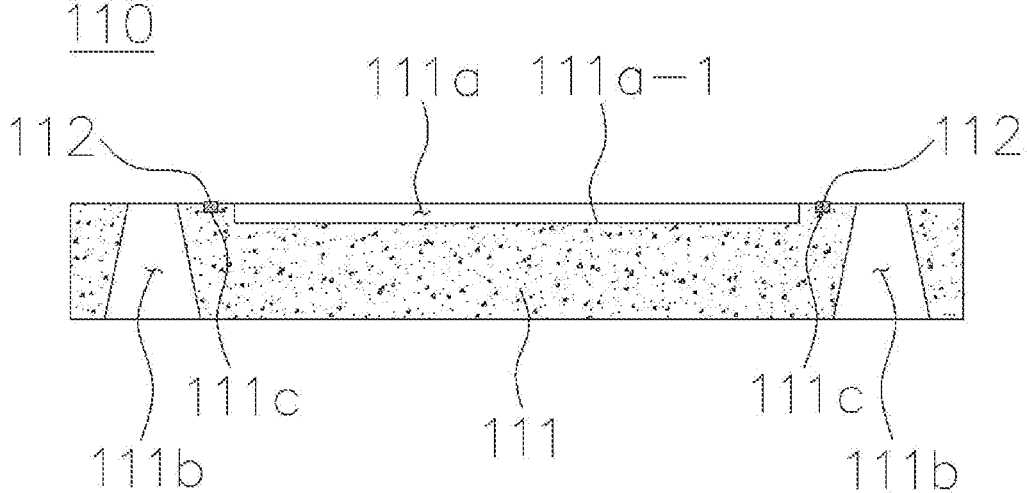
FIG. 1 is a sectional view of a first concrete block used in a floatable concrete block structure according to a first embodiment of the present disclosure.

Hereinafter, embodiments of the present disclosure will be described in detail with reference to the accompanying drawings so that those skilled in the art to which the present disclosure belongs can easily embody the present disclosure. However, the present disclosure may be embodied in various different forms and is not limited to the embodiments described herein. In addition, in the drawings, parts irrelevant to the description of the present disclosure are omitted in order to clearly describe the present disclosure, and similar reference numerals are assigned to similar parts throughout the specification.

Throughout the specification, when a part "includes" a certain component, it means that other components may be further included without being excluded unless specifically stated to the contrary.

First, a method of manufacturing a floatable concrete block structure according to a first embodiment of the present disclosure will be described.

Figure 2:
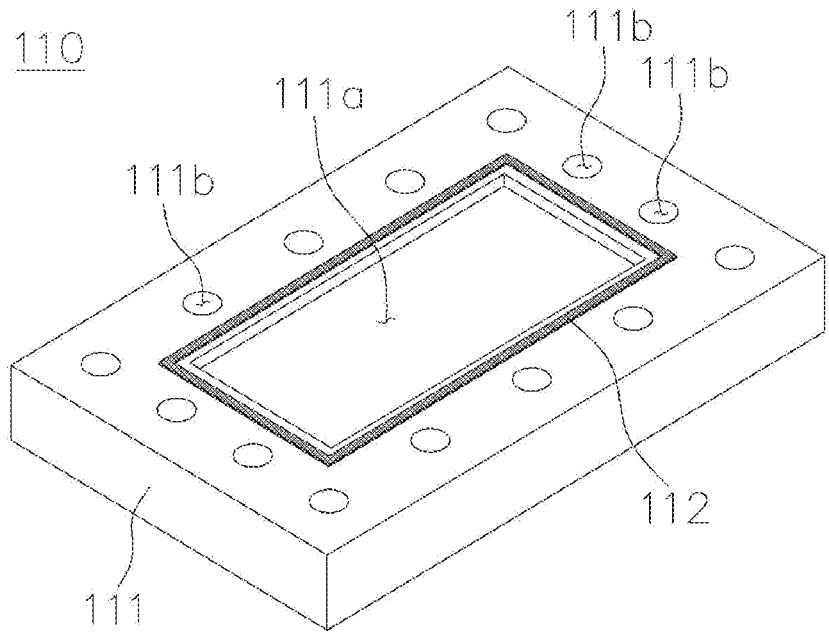
FIG. 2 is a perspective view of FIG. 1.
Figure 3:
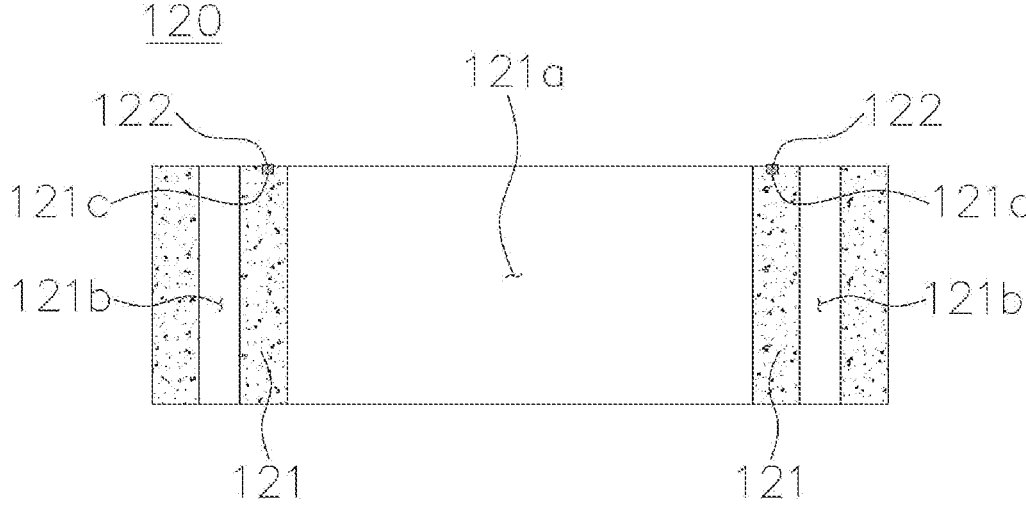
FIG. 3 is a sectional view of a second concrete block used in the floatable concrete block structure according to the first embodiment of the present disclosure.
Figure 4:
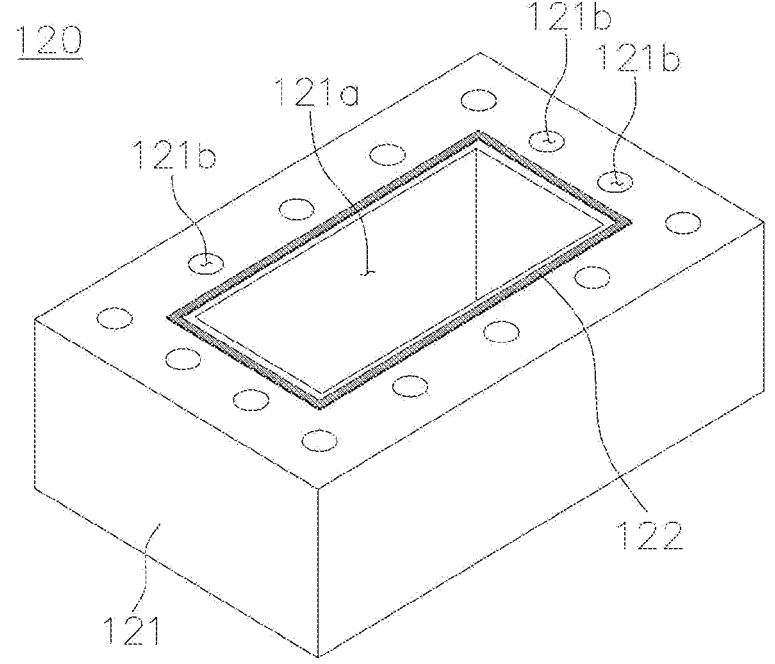
FIG. 4 is a perspective view of FIG. 3.
Figure 5:
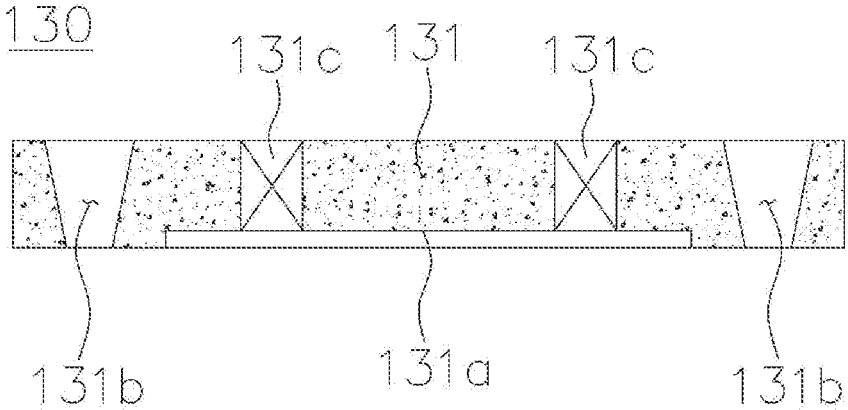
FIG. 5 is a sectional view of a third concrete block used in the floatable concrete block structure according to the first embodiment of the present disclosure.
Figure 6:
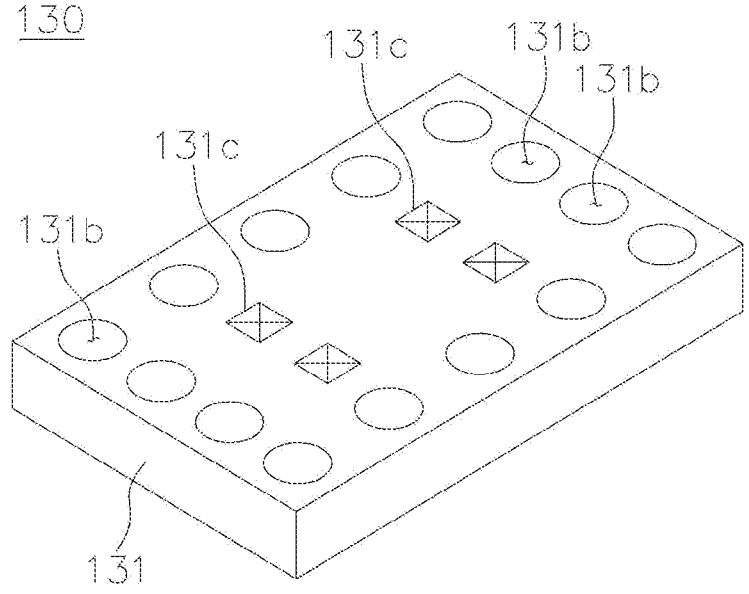
FIG. 6 is a perspective view of FIG. 5.

FIG. 1 is a sectional view of a first concrete block used in the floatable concrete block structure according to the first embodiment of the present disclosure, FIG. 2 is a perspective view of FIG. 1, FIG. 3 is a sectional view of a second concrete block used in the floatable concrete block structure according to the first embodiment of the present disclosure, FIG. 4 is a perspective view of FIG. 3, FIG. 5 is a sectional view of a third concrete block used in the floatable concrete block structure according to the first embodiment of the present disclosure, FIG. 6 is a perspective view of FIG. 5, and FIGS. 7 to 12 are views sequentially illustrating the method of manufacturing a floatable concrete block structure according to the first embodiment of the present disclosure.

(1) First Concrete Block Fabrication Step

In this embodiment, as illustrated in FIGS. 1 and 2, the first concrete block 110 is fabricated.

The first concrete block 110 includes a first concrete block body 111 having a cuboid shape.

A first buoyancy chamber 111*a* is formed in the upper center portion of the first concrete block body 111, and the upper surface of the first buoyancy chamber 111*a* is open and the lower surface thereof is closed.

The first buoyancy chamber 111*a* includes a buoyancy-chamber bottom surface 11*a*-1.

In this embodiment, one first buoyancy chamber 111*a* is formed and has a quadrangular shape on a plane.

However, depending on an embodiment, a plurality of first buoyancy chambers 111*a* may be formed, and the planar shape thereof may also be variously modified.

A plurality of first column space parts 111*b* are formed in the upper side of the first concrete block body 111 along the edge of the first buoyancy chamber 111*a*.

That is, the plurality of first column space parts 111*b* are disposed to surround the first buoyancy chamber 111*a*.

In this embodiment, each of the first column space parts 111*b* is a through hole having the shape of a truncated cone extending in a vertical direction.

A first packing groove 111*c* is formed on the upper surface of the first concrete block body 111 and has the shape of a quadrangular ring surrounding the first buoyancy chamber 111*a*, and a first watertight packing 112 is provided in the first packing groove 111*c*.

The fabricating of the first concrete block 110 may be performed on land or on a large barge.

(2) Second Concrete Block Fabrication Step

In this embodiment, as illustrated in FIGS. 3 and 4, the second concrete block 120 is fabricated.

The second concrete block 120 includes a second concrete block body 121 having a cuboid shape.

The second concrete block body 121 has a second buoyancy chamber 121*a* formed therein, and a plurality of second column through holes 121*b* formed along the edge of the second buoyancy chamber 121*a*.

The second buoyancy chamber 121*a* extends vertically and has open upper and lower surfaces. Each of the second column through holes 121b also extends vertically and has open upper and lower surfaces.

The second buoyancy chamber 121a preferably has a shape corresponding to the shape of the first buoyancy chamber 111a.

In this embodiment, the second buoyancy chamber 121a has a cuboid shape, and the second column through hole 121b has a cylindrical shape, but shapes thereof may be variously changed.

A second packing groove 121c is formed on the upper surface of the second concrete block body 121, and a second watertight packing 122 is provided in the second packing groove 121c.

The second packing groove 121c and the second watertight packing 122 are formed in the form of a quadrangular ring surrounding the second buoyancy chamber 121a.

(3) Third Concrete Block Fabrication Step

In this embodiment, as illustrated in FIGS. 5 and 6, the third concrete block 130 is fabricated.

The third concrete block 130 includes a third concrete block body 131 having a cuboid shape.

A buoyancy chamber ceiling surface 131a is formed in the center portion of the lower surface of the third concrete block body 131, and a plurality of third column through holes 131b are formed along the edge of the buoyancy chamber ceiling surface 131a.

In this embodiment, each of the third column through holes 131b is formed in the shape of an inverted truncated cone.

In addition, the third concrete block body 131 has working holes 131c formed therein so that the working holes 131c communicate with the buoyancy chamber ceiling surface 131a.

According to the embodiment, a door capable of opening/closing and sealing may be mounted to each of the working holes 131c.

(4) First Concrete Block Installation Step

Figure 7:
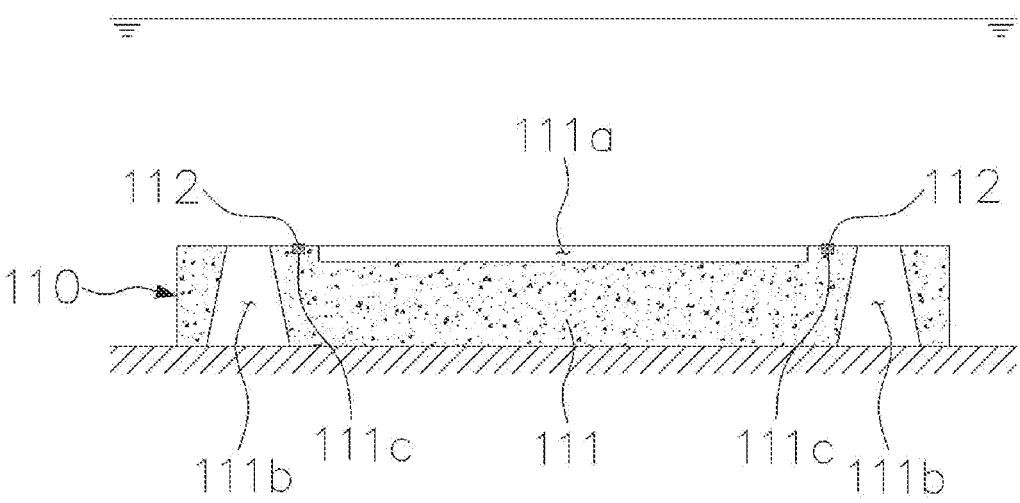
FIGS. 7 to 12 are views sequentially illustrating a method of manufacturing the floatable concrete block structure according to the first embodiment of the present disclosure.

After the first concrete block fabrication step, the first concrete block 110 is submerged in water as illustrated in FIG. 7.

(5) Second Concrete Block Installation Step

Figure 8:
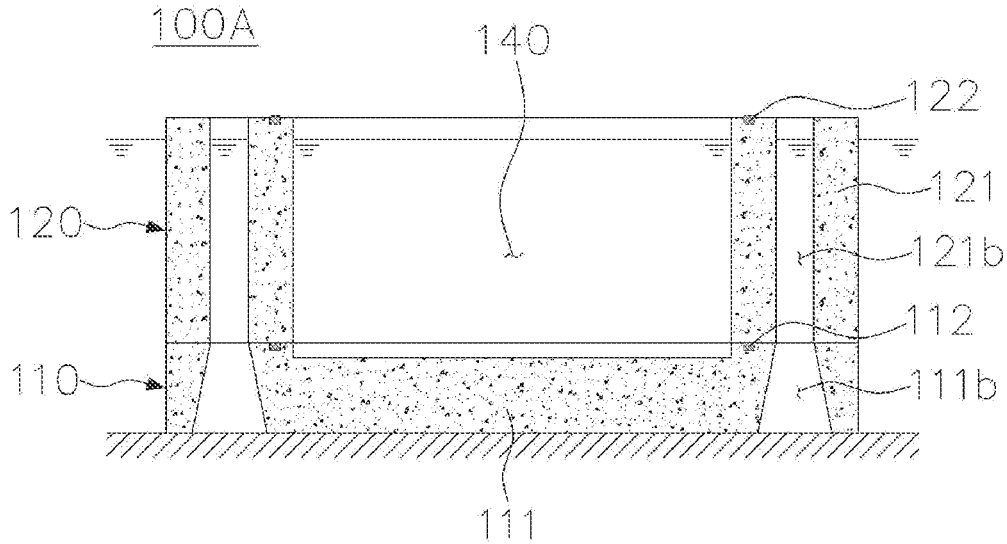

After the second concrete block fabrication step and the first concrete block installation step, the second concrete block 120 is installed on the upper part of the first concrete block 110 as illustrated in FIG. 8 so as to form a concrete block assembly 100A.

In this embodiment, one layer of the second concrete block 120 is installed on the first concrete block 110, but depending on an embodiment, a plurality of second concrete blocks 120 may be installed in multiple layers on the first concrete block 110.

Accordingly, an assembly buoyancy chamber 140 having a closed lower end is formed in the concrete block assembly 100A formed by the installation of the second concrete block 120.

In FIG. 8, the assembly buoyancy chamber 140 is formed by the second buoyancy chamber 121a of the second concrete block 120 and the first buoyancy chamber 111a including the buoyancy-chamber bottom surface 111a-1 of the first concrete block 110, and the upper end of the assembly buoyancy chamber 140 is open.

In the concrete block assembly 100A, the first watertight packing 112 is located between the first concrete block body 111 and the second concrete block body 121 and prevents water from being introduced into the assembly buoyancy chamber 140 from the outside.

That is, in the concrete block assembly 100A in the state of FIG. 8, although water exists inside the assembly buoyancy chamber 140, external water cannot flow into the assembly buoyancy chamber 140 due to the first watertight packing 112.

(6) Third Concrete Block Installation Step

Figure 9:
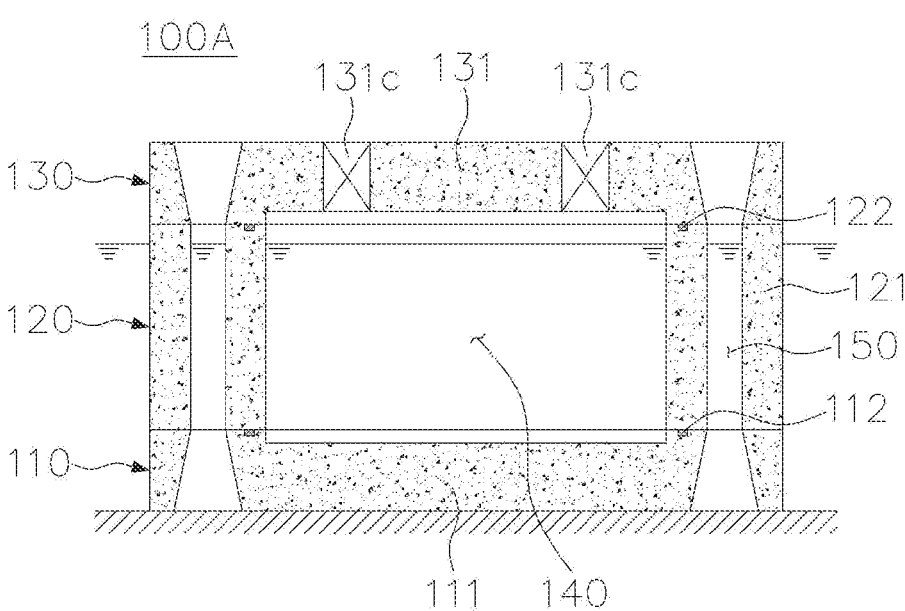

After the third concrete block fabrication step and the second concrete block installation step, as illustrated in FIG. 9, the third concrete block 130 is installed on the second concrete block 120, and thus the shape of the concrete block assembly 100A is completed.

In the concrete block assembly 100A, the second watertight packing 122 is located between the second concrete block body 121 and the third concrete block body 131 and prevents water from being introduced into the assembly buoyancy chamber 140 from the outside.

The third concrete block 130 covers the top of the assembly buoyancy chamber 140.

In the completed concrete block assembly 100A, the assembly buoyancy chamber 140 has both upper and lower sides closed by the second buoyancy chamber 121a of the second concrete block 120, the buoyancy-chamber bottom surface 111a-1 of the first concrete block 110, and the buoyancy chamber ceiling surface 131a of the third concrete block 130.

In addition, the first column space part 111b of the first concrete block 110, the second column through hole 121b of the second concrete block 120, and the third column through hole 131b of the third concrete block 130 communicate with each other to form a concrete-column through hole 150.

(7) Concrete Column Formation Step

After the third concrete block installation step, concrete columns 160 are formed in the concrete-column through holes 150.

That is, the concrete column 160 is formed along the first column space part 111b of the first concrete block 110, the second column through hole 121b of the second concrete block 120, and the third column through hole 131b of the third concrete block 130, and the first concrete block 110, the second concrete block 120, and the third concrete block 130 are coupled to each other by the concrete columns 160 to form the concrete block structure 100B.

In this embodiment, the concrete column 160 is formed by inserting a concrete column formation part into the concrete-column through hole 150.

The concrete column formation part includes a column rebar assembly 161 having a shape extending in a vertical direction, a waterproof membrane 162 covering the lower and side parts of the column rebar assembly 161, and uncured concrete 163 (referred to as "fresh concrete") injected into the waterproof membrane 162.

When the concrete column formation part is inserted into the concrete-column through hole 150, the fresh concrete 163 is cured while the waterproof membrane 162 is brought into close contact with the first, second, and third concrete blocks 110, 120, and 130 by the pressure of the fresh concrete 163, and thus the concrete column 160 extending in the vertical direction is formed in the concrete block assembly 100A.

This process is described in more detail in Korean Patent No. 10-2022339 "CONSTRUCTION METHOD FOR UNDERWATER CONCRETE BLOCK STRUCTURE" (registered on Sep. 10, 2019) incorporated in the present specification, so a detailed description thereof will be omitted.

Figure 10:
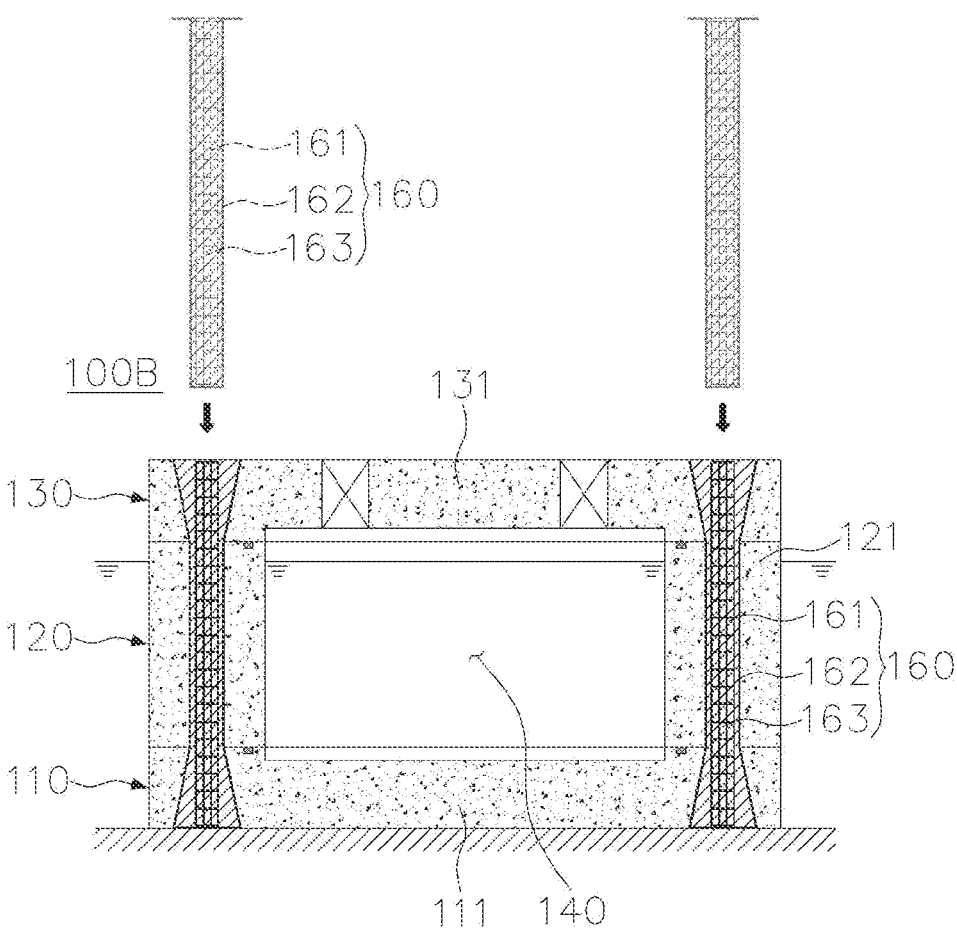

As illustrated in FIG. 10, the first column space part 111b has the shape of a truncated cone and the third column through hole 131*b* has the shape of an inverted truncated cone, and accordingly, the concrete column 160 has a structure which prevents the first concrete block 110, the second concrete block 120, and the third concrete block 130 from departing from each other.

In the case of this embodiment, the first column space part 111*b* is formed in the first concrete block 110, but this is only one embodiment.

If, instead of forming the first column space part 111*b* in the first concrete block 110, the first concrete block 110 has connecting protrusions protruding to the inside of the second column through holes 121*b*, the concrete columns 160 are formed in the second column through holes 121*b* of the second concrete block 120 and the third column through holes 131*b* of the third concrete block 130, and the concrete columns 160 are coupled to the connecting protrusions of the first concrete block 110, it is possible to form the concrete block structure 100B in which the first concrete block 110, the second concrete block 120, and the third concrete block 130 are coupled to each other by the concrete columns 160.

At this stage, water is still present inside the assembly buoyancy chamber 140.

(8) Assembly Buoyancy Chamber Drainage Step

Figure 11:
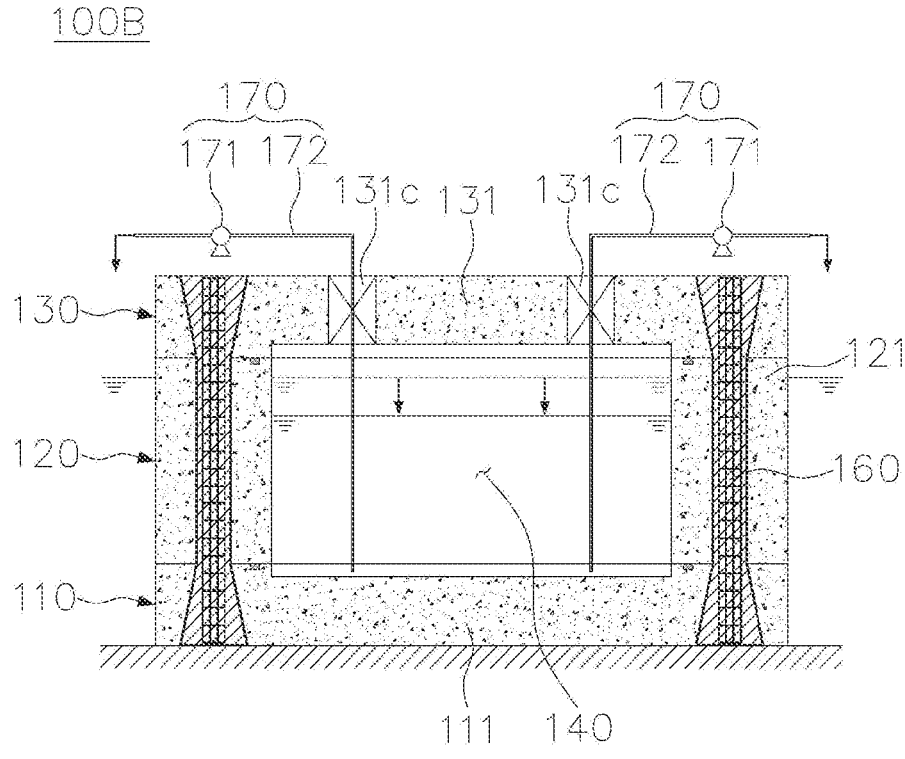

After the concrete column formation step, as illustrated in FIG. 11, an assembly buoyancy chamber drainage step is performed to remove water inside the assembly buoyancy chamber 140.

A drainage device 170 including a drain pump 171 and a drain hose 172 is provided in the concrete block structure 100B, and the water contained inside the assembly buoyancy chamber 140 is discharged through the drainage device 170 to the outside by the operation of the drain pump 171.

Meanwhile, water cannot flow into the assembly buoyancy chamber 140 from the outside due to the first watertight packing 112 and the second watertight packing 122, and, due to this step, the assembly buoyancy chamber 140 becomes dry.

Figure 12:
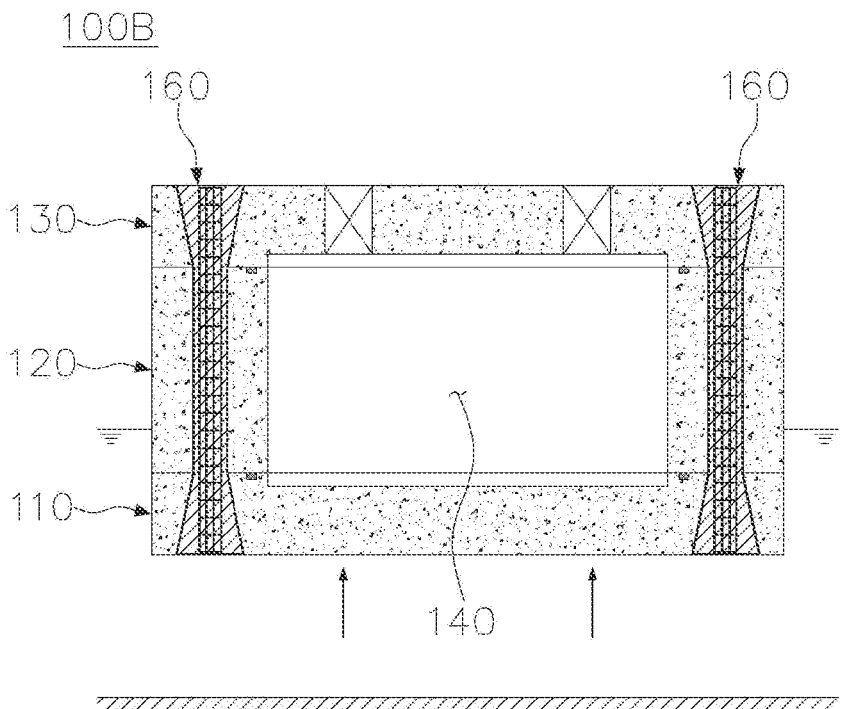

When the water inside the assembly buoyancy chamber 140 is drained in this way, as illustrated in FIG. 12, the concrete block structure 100B floats to a water surface due to the buoyancy of the assembly buoyancy chamber 140.

Accordingly, the concrete block structure 100B of the present disclosure is completed.

In this embodiment, although the drainage device 170 is described to be temporarily installed, the drainage device 170 may be permanently installed in the concrete block structure 100B for the function of a buoyancy control device according to an embodiment.

Figure 13:
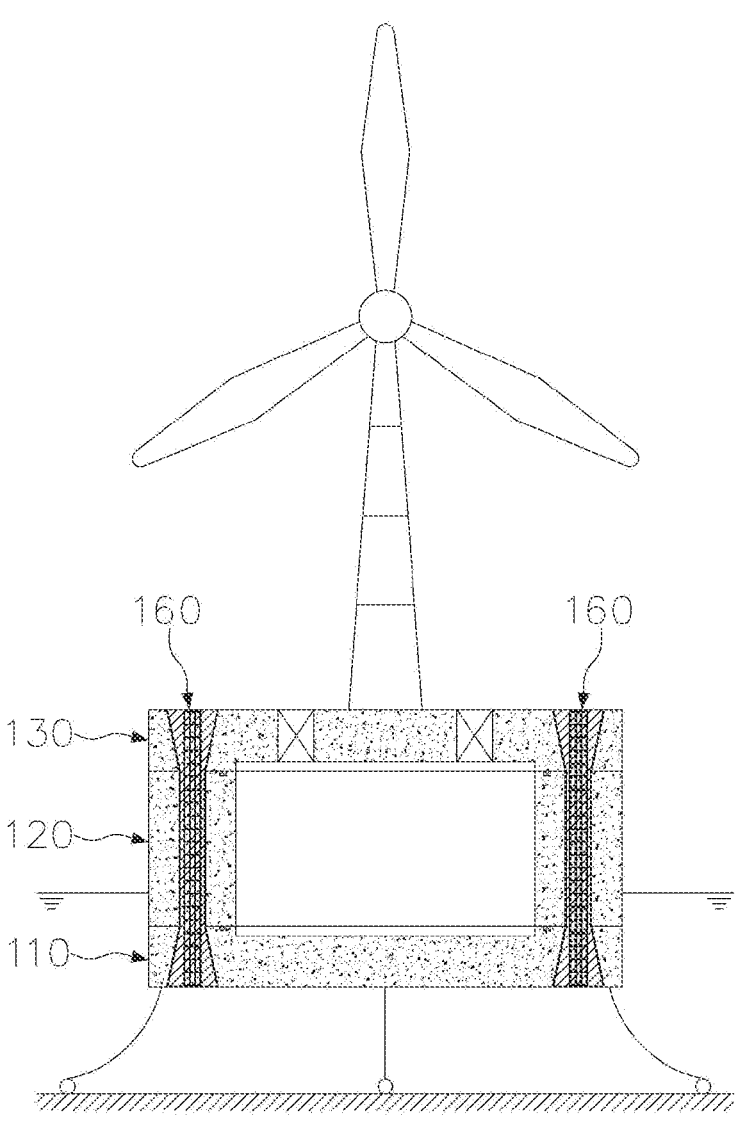
FIG. 13 is a view illustrating how the concrete block structure according to the first embodiment of the present disclosure is used.

FIG. 13 illustrates how the concrete block structure 100B of the present disclosure is used, and illustrates that a marine wind power generation apparatus can be installed and used on the concrete block structure 100B.

Although the concrete block structure 100B is illustrated to float on the sea in FIG. 13, the concrete block structure 100B may support the marine wind power generation apparatus while the concrete block structure 100B is submerged in the water when the assembly buoyancy chamber 140 of the concrete block structure 100B is filled with water. In addition, when the water is drained from the assembly buoyancy chamber 140 of the concrete block structure 100B submerged in the water by using the buoyancy control device, the concrete block structure 100B floats on the water. In this state, the concrete block structure 100B may be repaired or may be moved to another location.

Figure 14:
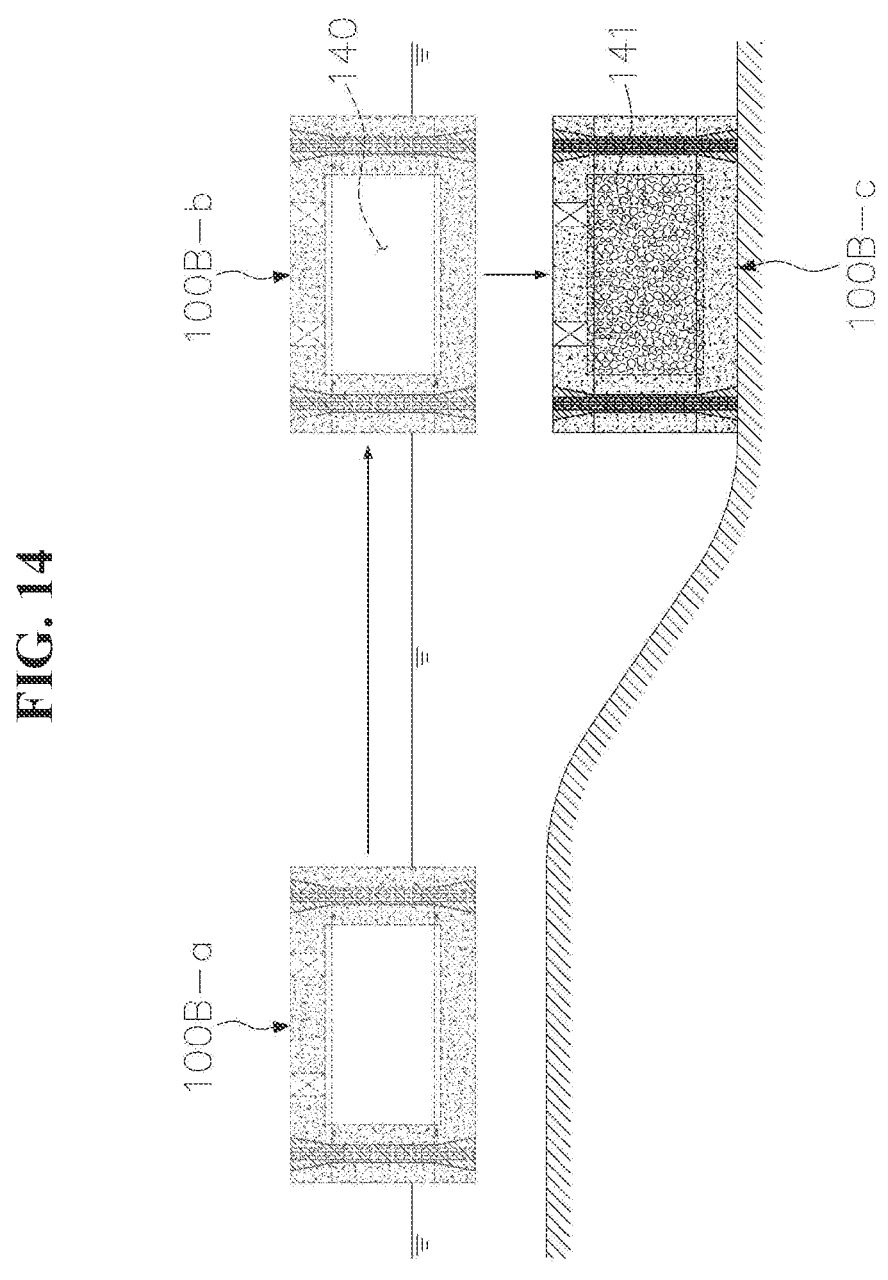

FIG. 14 illustrates how the concrete block structure 100B of the present disclosure is used differently.

In this figure, for the use of the concrete block structure 100B, the method of the present disclosure further includes a transferring step and a structure submerging step.

Transferring Step:

First, after manufacturing the concrete block structure 100B in shallow water and floating the concrete block structure 100B (100B-a), the concrete block structure 100B-a floating on the surface of the water is transferred (100B-b) to another location (a deep-water location for installation) by a ship.

Meanwhile, before floating the concrete block structure 100B, the marine wind power generation apparatus may be installed on the top of the concrete block structure 100B in advance to be transferred, and accordingly, the concrete block structure 100B may be used for the installation and transportation of the marine wind power generation apparatus.

Structure Submerging Step:

After the transferring step, a filling material 141 such as sand, gravel, or riprap is inserted into the assembly buoyancy chamber 140 of the concrete block structure 100B-b so as to submerge the concrete block structure 100B-b in water.

That is, the assembly buoyancy chamber 140 may be used as not only a space for generating buoyancy but also a space for filling the filling material 141.

When the filling material 141 is filled in the assembly buoyancy chamber 140, the concrete block structure 100B-b loses buoyancy and sinks in the water.

The concrete block structure 100B-c submerged in the water in this way may be used as an underwater concrete block structure.

Figure 15:
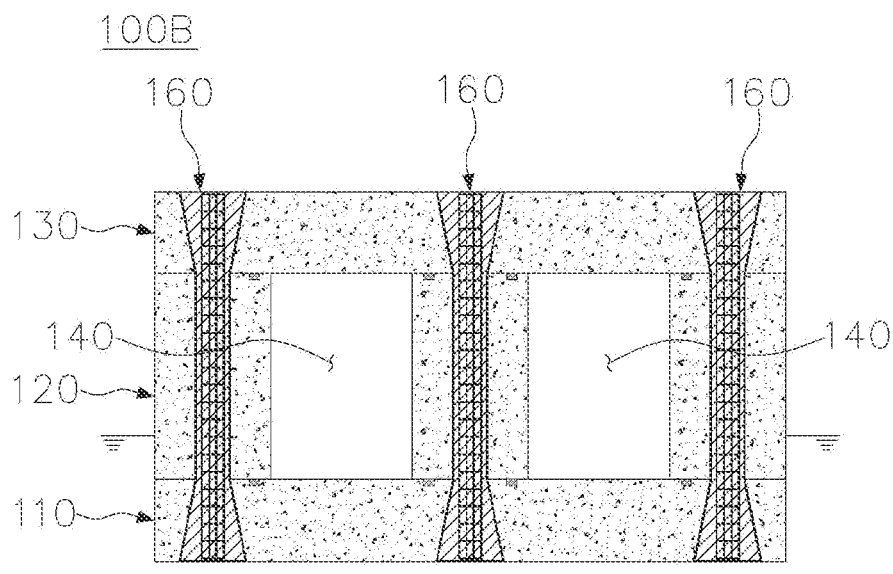
FIG. 15 is a view illustrating a modified form of FIG. 12.

FIG. 15 illustrates a modified form of FIG. 12.

This figure illustrates that two assembly buoyancy chambers 140 may be formed. That is, according to an embodiment, the number of the assembly buoyancy chambers 140 may be varied.

In addition, this figure illustrates that the working holes 131*c* are not formed in the third concrete block 130 by blocking the working holes 131*c* after the draining.

Figure 16:
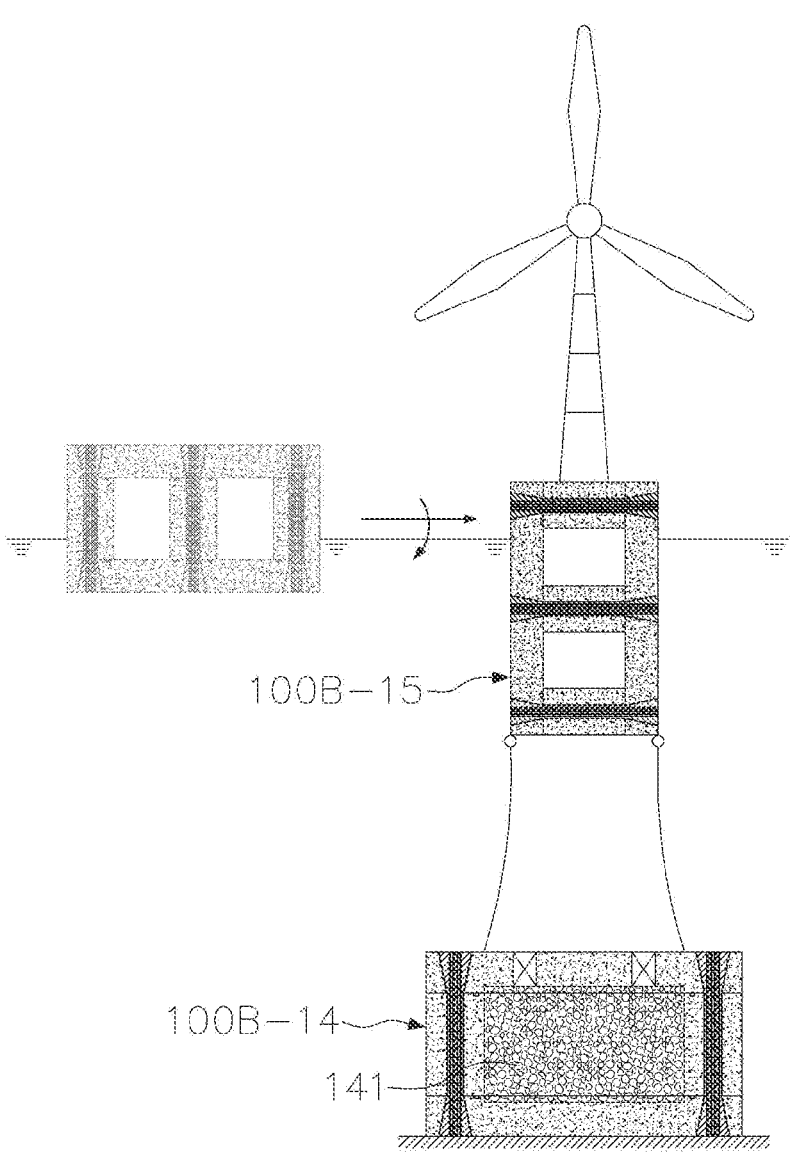
FIG. 16 is a view illustrating an example in which the concrete block structure of FIG. 14 and the concrete block structure of FIG. 15 are applied.

FIG. 16 illustrates an example in which the concrete block structure 100B-14 of FIG. 14 and the concrete block structure 100B-15 of FIG. 15 are applied.

Particularly, after the concrete block structure 100B-15 is floated on the water surface as illustrated in FIG. 15, the concrete block structure 100B-15 is transferred to another location (a deep-water location for installation) by a ship, etc., and is moored according to the concrete block structure 100B-14.

Particularly, FIG. 16 illustrates that the concrete block structure 100B-15 may be rotated at 90 degrees and moored by the concrete block structure 100B-14.

In addition, the marine wind power generation apparatus is installed on the top of the concrete block structure 100B-15.

Figure 17:
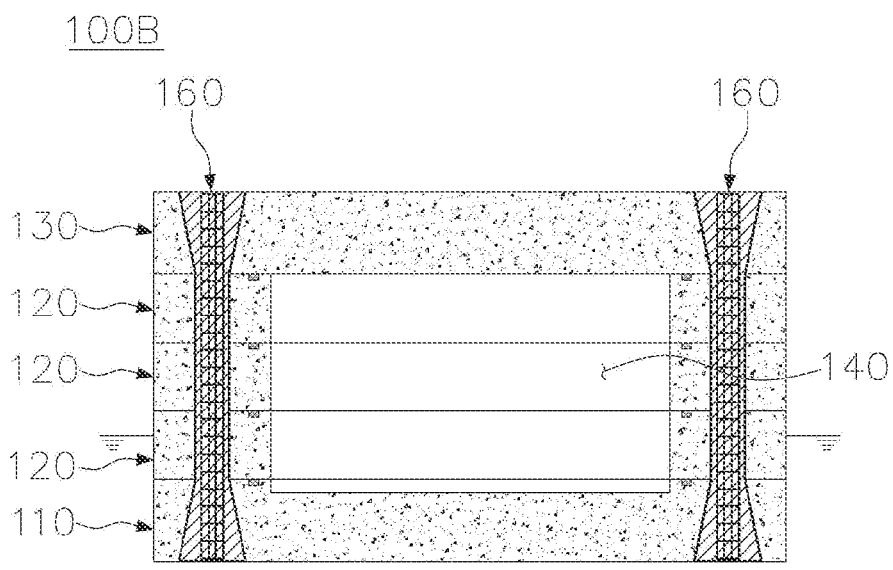
FIG. 17 is a view illustrating another modified form of FIG. 12.

FIG. 17 illustrates another modified form of FIG. 12.

In this modified example, the second concrete blocks 120 are installed in multiple layers.

Here, the second watertight packing 122 is located between the second concrete blocks 120 installed to be vertically adjacent to each other and prevents the inflow of water into the assembly buoyancy chamber 140 from the outside.

Figure 18:
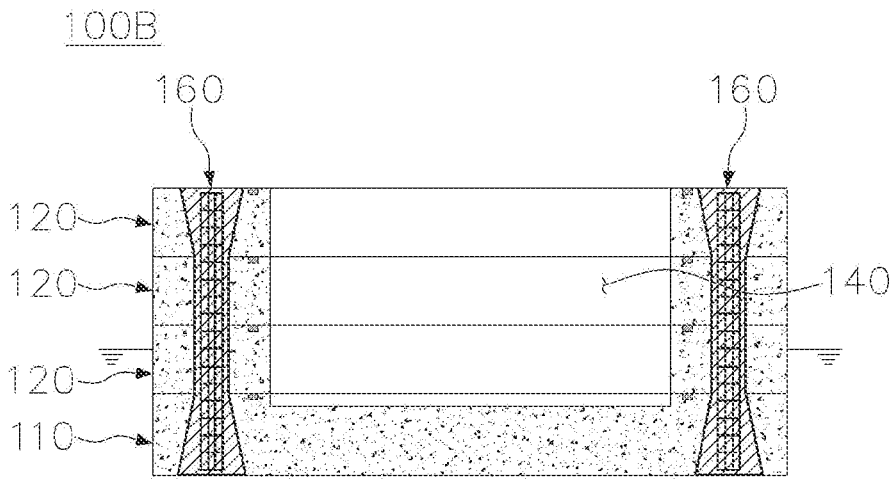
FIG. 18 is a view illustrating a modified form of FIG. 17.

FIG. 18 illustrates a modified form of FIG. 17.

In this modified example, it is illustrated that without the third concrete block 130, the concrete block structure 100B can be formed by the first concrete block 110 and the second concrete block 120.

In this case, the assembly buoyancy chamber 140 has an open top.

In addition, the second column through hole 121b of the second concrete block 120 located at the uppermost part has a shape of an inverted truncated cone.

Next, a method of manufacturing a floatable concrete block structure according to a second embodiment of the present disclosure will be described.

Figure 19:
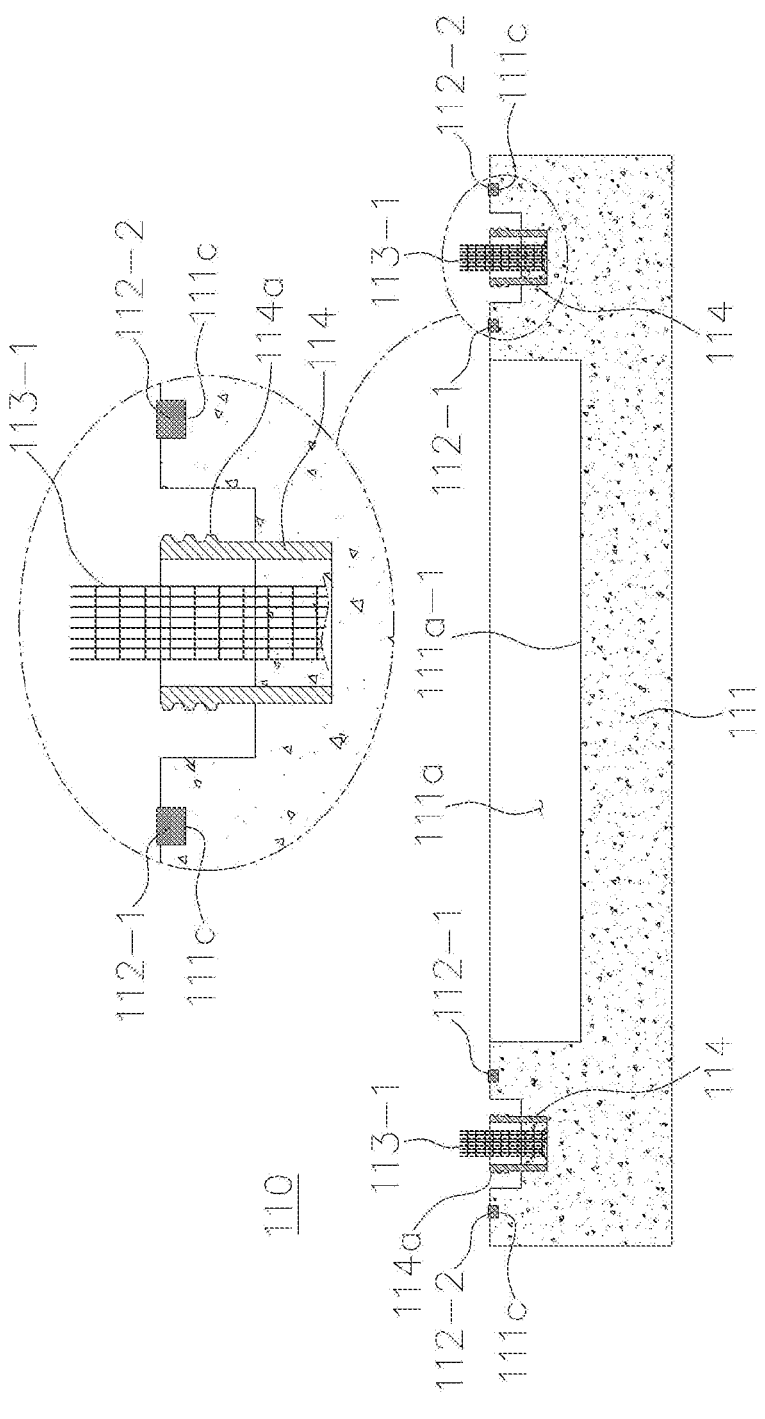
FIG. 19 is a sectional view of a first concrete block used in a floatable concrete block structure according to a second embodiment of the present disclosure.
Figure 20:
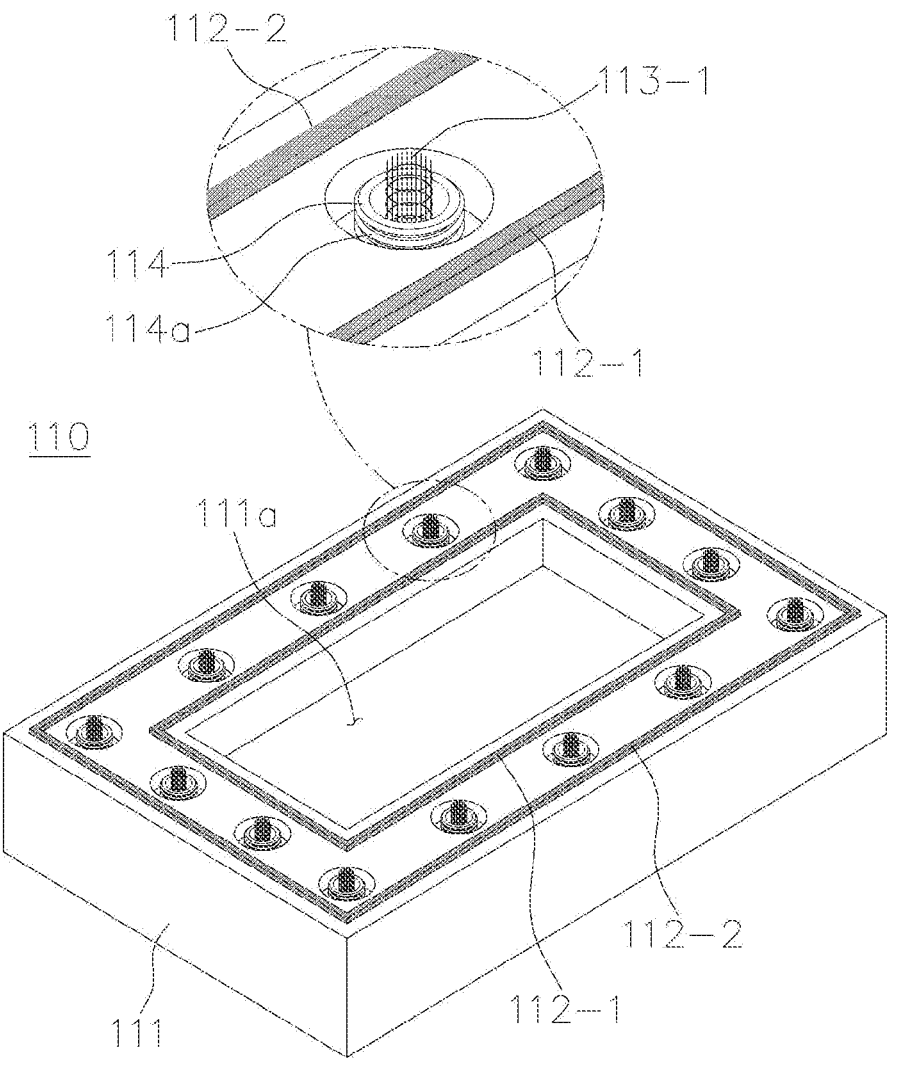
FIG. 20 is a perspective view of FIG. 19.
Figure 21:
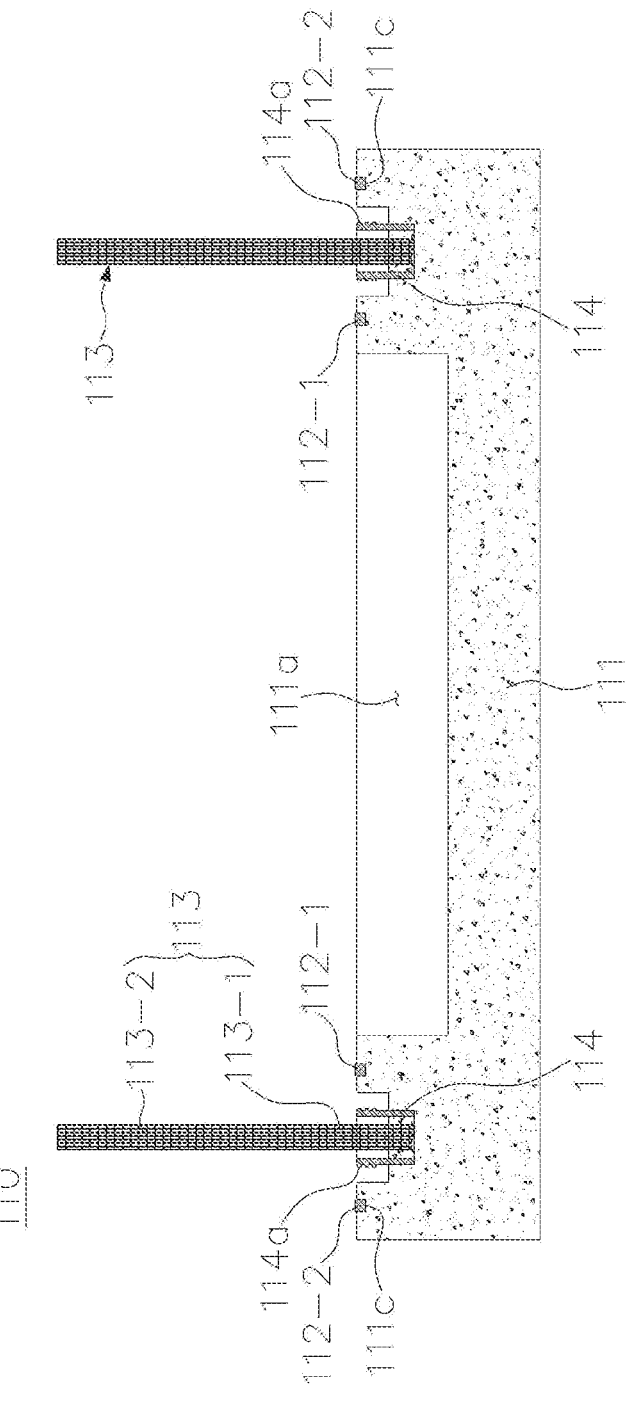
FIG. 21 is a sectional view of a state in which an extension rebar assembly is coupled to the first concrete block after FIG. 19.
Figure 22:
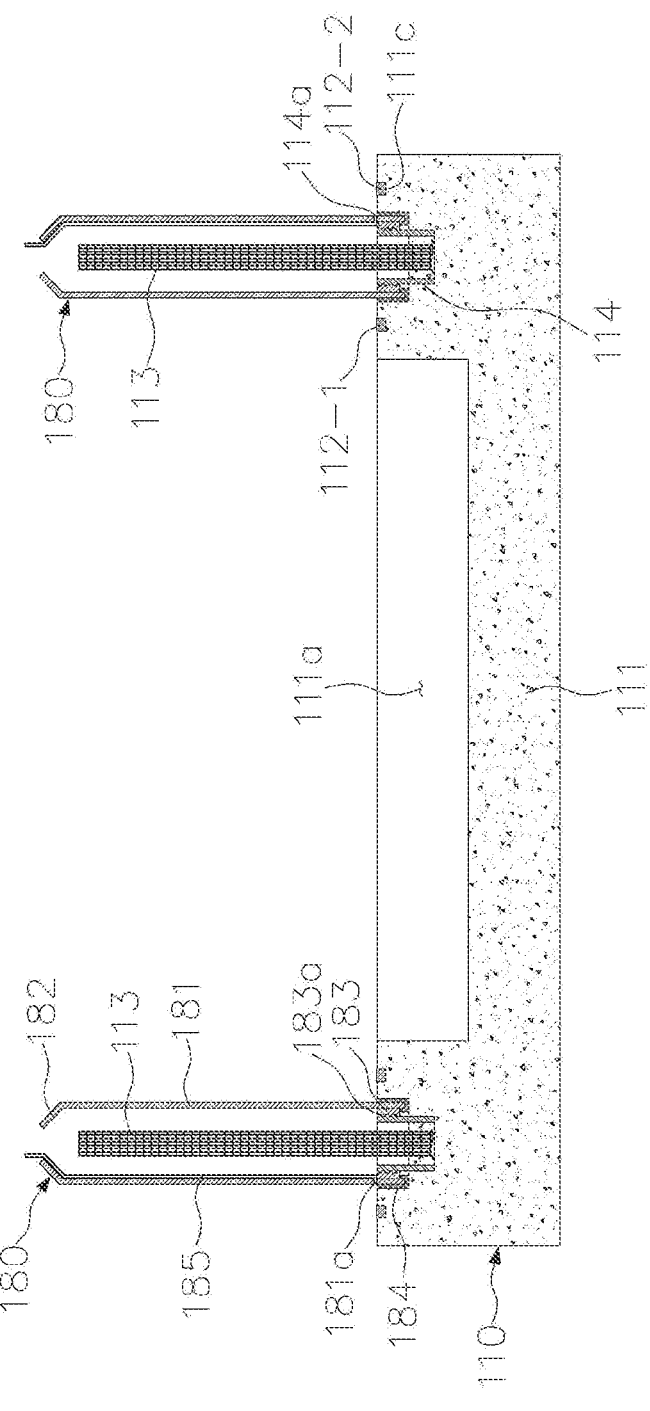
FIG. 22 is a sectional view of a state in which a guide pole is detachably coupled to the first concrete block after FIG. 21.
Figure 23:
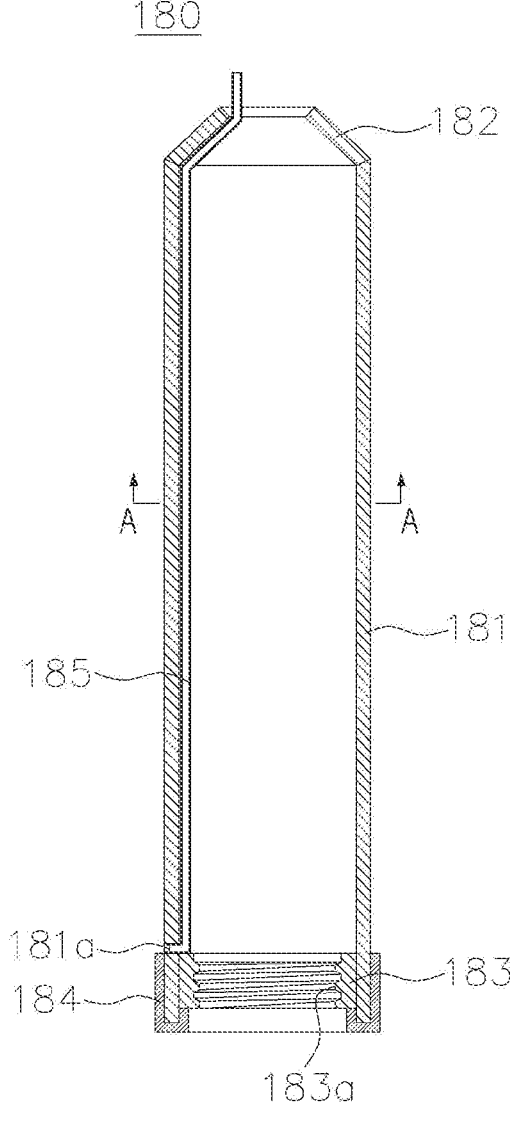
FIG. 23 is a sectional view of the guide pole of FIG. 22.
Figure 24:
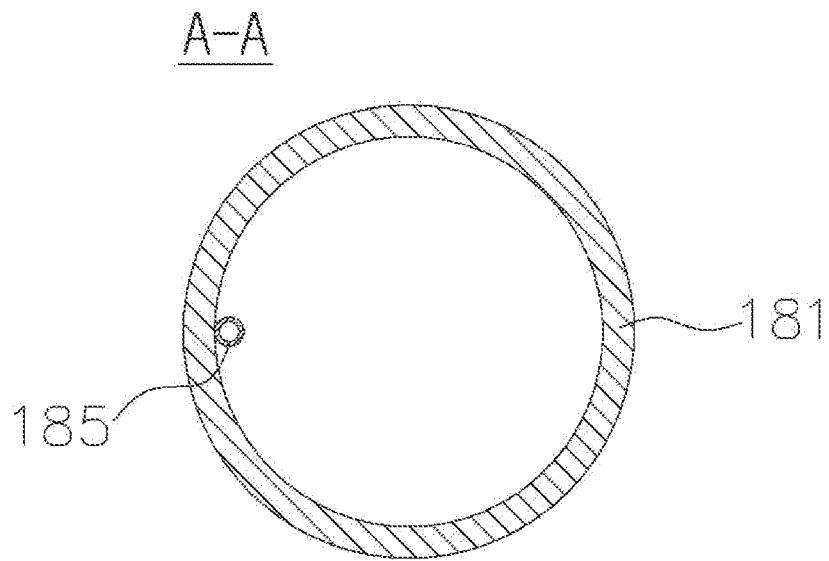
FIG. 24 is a cross-sectional view taken along line A-A of FIG. 23.
Figure 25:
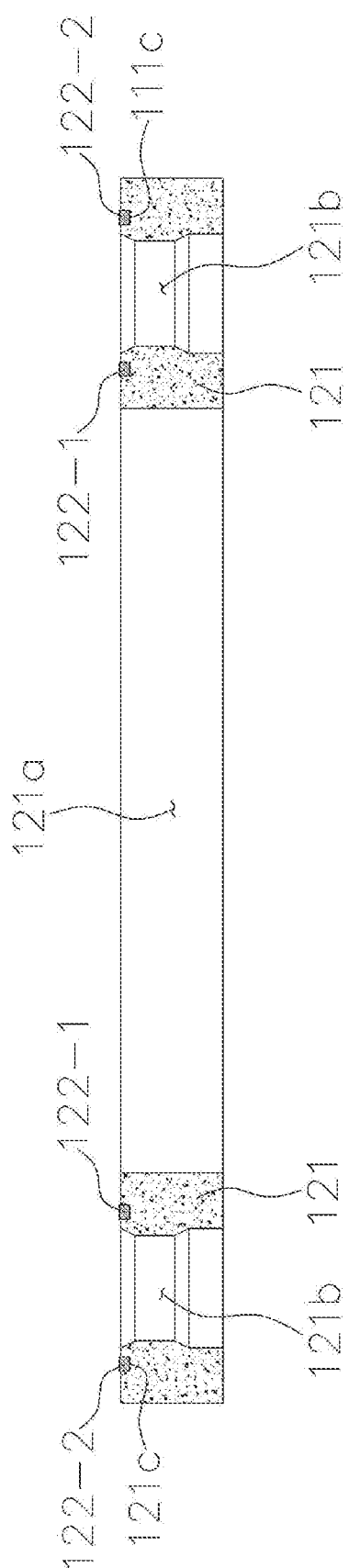
FIG. 25 is a sectional view of a second concrete block used in the floatable concrete block structure according to the second embodiment of the present disclosure.
Figure 26:
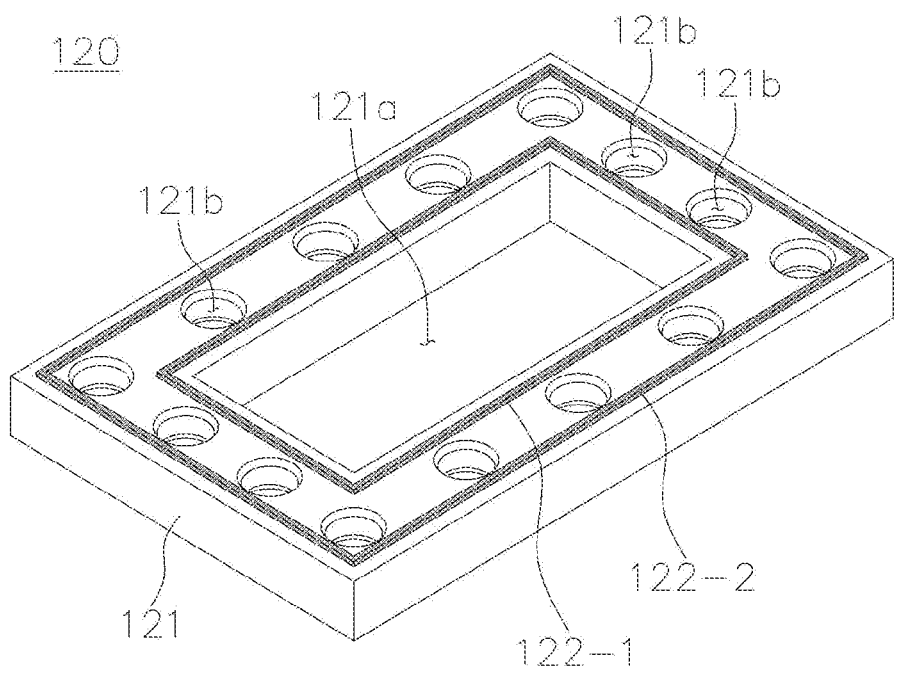
FIG. 26 is a perspective view of FIG. 25.

FIG. 19 is a sectional view of a first concrete block used in the floatable concrete block structure according to the second embodiment of the present disclosure, FIG. 20 is a perspective view of FIG. 19, FIG. 21 is a sectional view of a state in which an extension rebar assembly is coupled to the first concrete block after FIG. 19, FIG. 22 is a sectional view of a state in which a guide pole is detachably coupled to the first concrete block after FIG. 21, FIG. 23 is a sectional view of the guide pole of FIG. 22, FIG. 24 is a cross-sectional view taken along line A-A of FIG. 23, FIG. is a sectional view of a second concrete block used in the floatable concrete block structure according to the second embodiment of the present disclosure, FIG. 26 is a perspective view of FIG. 25, FIGS. 27 to 34 are views sequentially illustrating the method of manufacturing the floatable concrete block structure according to the second embodiment of the present disclosure.

(1) First Concrete Block Fabrication Step

In this embodiment, fabricating of the first concrete block proceeds in the order of FIGS. 19 and 21.

First, as illustrated in FIGS. 19 and 20, the first concrete block 110 is fabricated.

As illustrated in FIG. 20, the first concrete block 110 includes the first concrete block body 111 having a cuboid shape.

The first buoyancy chamber 111a is formed in the center portion of the upper surface of the first concrete block body 111.

Furthermore, the first concrete block body 111 is provided with a plurality of preliminary rebar assemblies 113-1 and a plurality of block-side couplers 114 along the edge of the first buoyancy chamber 111a.

In this embodiment, fourteen preliminary rebar assemblies 113-1 are provided, and the block-side coupler 114 is provided for each of the preliminary rebar assemblies 113-1.

Each of the preliminary rebar assemblies 113-1 has a lower end part connected to the inside of the first concrete block body 111 (specifically, the inner reinforcing bar of the first concrete block body 111) and extends vertically upward from the lower end part to protrude upward from the upper surface of the first concrete block body 111.

As illustrated in FIG. 21, the extension rebar assembly 113-2 is connected to the preliminary rebar assembly 113-1, and thus the preliminary rebar assembly 113-1 and the extension rebar assembly 113-2 together constitute a column rebar assembly 113.

The block-side coupler 114 is provided in a form surrounding the preliminary rebar assembly 113-1.

In this embodiment, the block-side coupler 114 has a form of a pipe and the preliminary rebar assembly 113-1 is disposed therein, and male threads 114a are formed on an outer circumferential surface thereof.

Two first packing grooves 111c are formed on the upper surface of the first concrete block body 111, and the first watertight packing 112 is provided in each of the first packing grooves 111c.

The first packing groove 111c and the first watertight packing 112 are formed in the form of a quadrangular ring surrounding the first buoyancy chamber 111a.

Meanwhile, the first watertight packings 112 may be categorized into a first inner watertight packing 112-1 surrounding a buoyancy-chamber bottom surface 111a, and a first outer watertight packing 112-2 which is located outside the first inner watertight packing 112-1 and surrounds the first inner watertight packing 112-1.

The plurality of preliminary rebar assemblies 113-1 are located between the first inner watertight packing 112-1 and the first outer watertight packing 112-2.

After fabricating the first concrete block 110 as illustrated in FIG. 19, the extension rebar assembly 113-2 is connected to the preliminary rebar assembly 113-1 as illustrated in FIG. 21, and the fabricating of the first concrete block 110 is completed.

Accordingly, the first concrete block 110 includes the first concrete block body 111, the first watertight packing 112, the column rebar assembly 113, and the block-side coupler 114.

(2) Guide Pole Installation Step

After the first concrete block fabrication step, as illustrated in FIG. 22, the guide pole 180 is detachably coupled to the block-side coupler 114 of the first concrete block 110.

As illustrated in FIGS. 23 and 24, the guide pole 180 includes a guide pipe 181, an upper insertion guide part 182, a pipe-side coupler 183, a third watertight packing 184, and a drain pipe 185.

The guide pipe 181, which has a shape of a pipe extending in a vertical direction, has a hollow extending in the vertical direction formed along the inside thereof and is open in the upper and lower parts thereof.

Accordingly, the column rebar assembly 113 may be inserted along the inside of the guide pipe 181.

The guide pipe 181 has a drain hole 181a formed at a lower end part thereof.

The upper insertion guide part 182 is formed at the upper end of the guide pipe 181 and has an upwardly tapered shape.

The upper insertion guide part 182 is intended to a guide for installing a second concrete block 120 to be described later.

The pipe-side coupler 183 is provided on the inner circumferential surface of the lower end part of the guide pipe 181 and is detachably coupled to the block-side coupler 114 of the first concrete block 110.

To this end, female threads 183a are formed in the pipe-side coupler 183 so as to be screwed to the male threads 114a of the block-side coupler 114.

In this embodiment, although the pipe-side coupler 183 and the block-side coupler 114 are exemplified by screw coupling in order to be detachably coupled, the detachable coupling structure may be applied in a variety of ways.

The third watertight packing 184 is provided on the lower end part of the guide pipe 181, and when the guide pole 180 is coupled to the block-side coupler 114, that is, when the pipe-side coupler 183 is screwed to the block-side coupler 114, water is prevented from being introduced into the guide pipe 181 from the outside.

When the pipe-side coupler 183 of the guide pole 180 is screwed to the block-side coupler 114, the third watertight packing 184 is in close contact with the first concrete block 110, so water can be prevented from being introduced into the guide pipe 181.

The drain pipe 185 is a tube extending vertically inside the guide pole 180, and the lower end of the drain pipe 185 communicates with the outside through the drain hole 181a formed in the lower end part of the guide pipe 181, and the upper end of the drain pipe 185 extends up to the upper end part of the guide pole 180.

In this embodiment, the drain pipe 185 is in close contact with the inner circumferential surface of the guide pipe 181 and extends in the vertical direction.

The first concrete block 110 can be installed underwater after the guide pole 180 is coupled to the block-side coupler 114 as illustrated in FIG. 22.

In some cases, the guide pole 180 may be manufactured in a form that is simply mounted on the top of the first concrete block 110, and in this case, the guide pole installation step may be performed after the first concrete block installation step.

(3) Second Concrete Block Fabrication Step

In this embodiment, as illustrated in FIGS. 25 and 26, the second concrete block 120 is fabricated.

The second concrete block 120 includes the second concrete block body 121 having a cuboid shape.

The second concrete block body 121 includes the second buoyancy chamber 121*a*, and the plurality of second column through holes 121*b* formed along the edge of the second buoyancy chamber 121*a*.

The second buoyancy chamber 121*a* extends in the vertical direction, and the second column through hole 121*b* also extends in the vertical direction.

Two second packing grooves 121*c* are formed on the upper surface of the second concrete block body 121, and the second watertight packing 122 is provided in each of the second packing grooves 121*c*.

The second packing groove 121*c* and the second watertight packing 122 are formed in the form of a quadrangular ring surrounding the second buoyancy chamber 121*a*.

The second watertight packings 122 may be categorized into a second inner watertight packing 122-1 surrounding the second buoyancy chamber 121*a*, and a second outer watertight packing 122-2 which is located outside the second inner watertight packing 122-1 and surrounds the second inner watertight packing 122-1.

The plurality of second column through holes 121*b* are located between the second inner watertight packing 122-1 and the second outer watertight packing 122-2.

The second column through hole 121*b* has a diameter larger than the diameter of the guide pipe 181.

(4) First Concrete Block Installation Step

Figure 27:
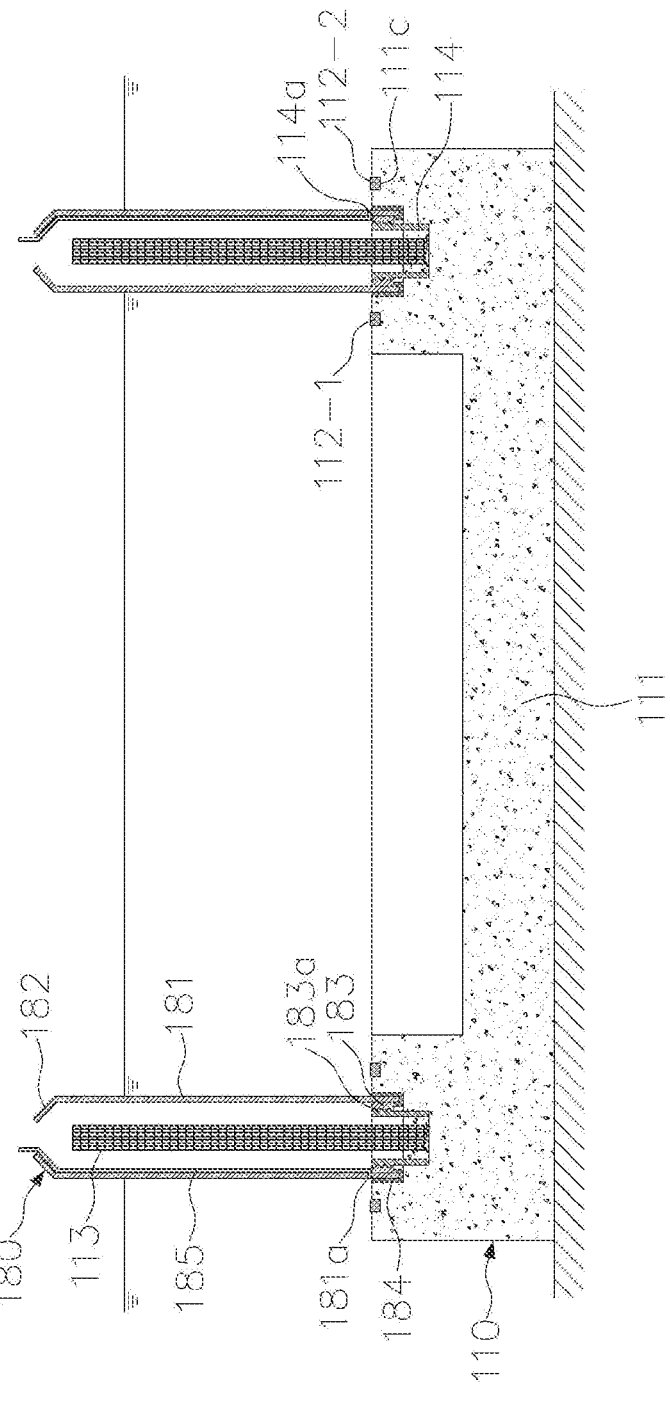

After the first concrete block fabrication step and the guide pole installation step, the first concrete block 110 is submerged in water as illustrated in FIG. 27.

That is, after the guide pole 180 is installed in the first concrete block 110 as illustrated in FIG. 22, the first concrete block 110 is installed underwater as illustrated in FIG. 27.

As illustrated in FIG. 27, the third watertight packing 184 is in close contact with the first concrete block 110 and prevents water from being introduced into the guide pole 180.

Furthermore, the upper end of the guide pole 180 protrudes from a water surface.

Accordingly, in this embodiment, the column rebar assembly 113 is not in contact with seawater by the guide pole 180. Accordingly, the column rebar assembly 113 has no risk of corrosion due to contact with seawater.

(5) Second Concrete Block Installation Step

Figure 28:
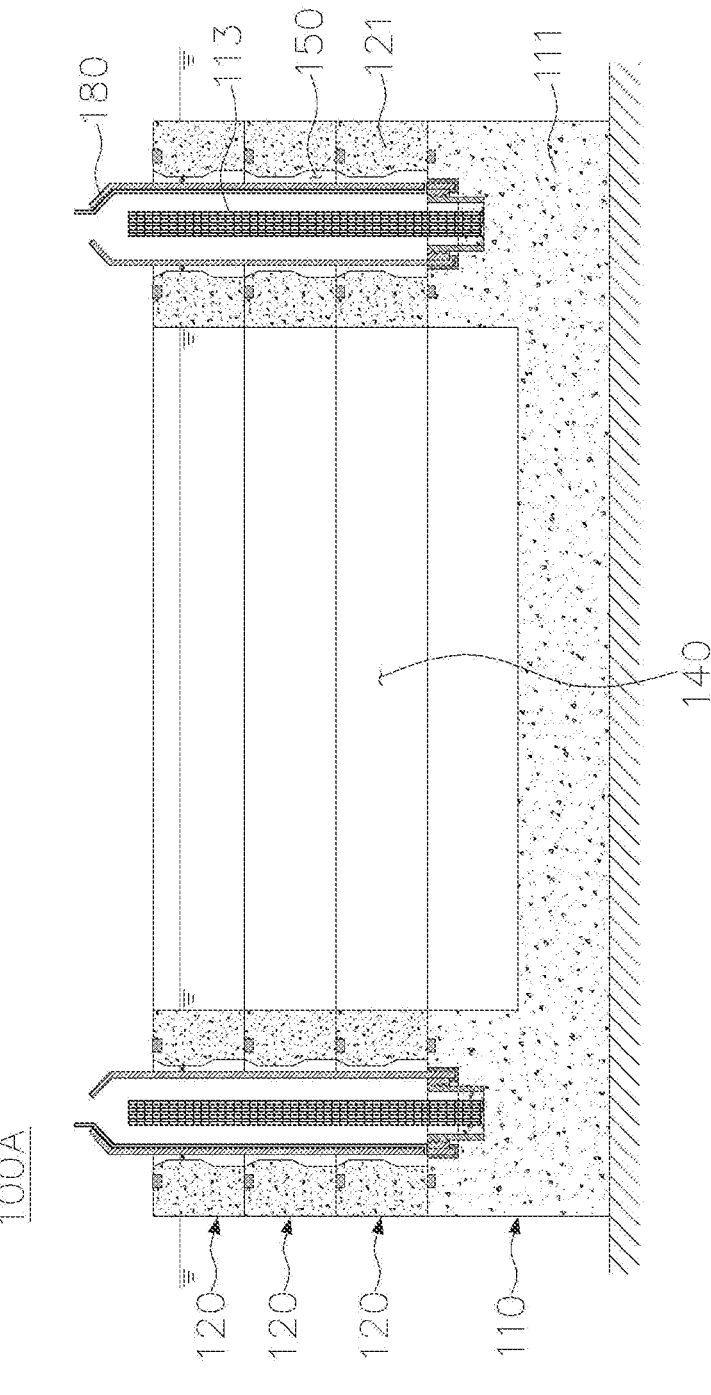

After the second concrete block fabrication step and the first concrete block installation step, as illustrated in FIG. 28, the second concrete blocks 120 are installed on the top of the first concrete block 110, and thus the concrete block assembly 100A is formed.

As illustrated in FIG. 28, the second concrete blocks 120 are installed so that the column rebar assemblies 113 of the first concrete block 110 installed underwater are inserted into the second column through holes 121*b* of the second concrete blocks 120.

Accordingly, in the concrete block assembly 100A formed by the installation of the second concrete blocks 120, the assembly buoyancy chamber 140 having a closed lower end is formed.

The assembly buoyancy chamber 140 is formed by the second buoyancy chamber 121*a* of each of the second concrete blocks 120 and the first buoyancy chamber 111*a* of the first concrete block 110, and the upper end of the assembly buoyancy chamber 140 is open.

In the concrete block assembly 100A, the first watertight packing 112 is located between the first concrete block body 111 and the second concrete block body 121 and prevents water from being introduced into the assembly buoyancy chamber 140 from the outside, and the second watertight packing 122 is located between the second concrete block bodies 121 disposed to be vertically adjacent to each other and prevents water from being introduced into the assembly buoyancy chamber 140 from the outside.

That is, in the concrete block assembly 100A, although water exists in the assembly buoyancy chamber 140, external water cannot flow into the assembly buoyancy chamber 140 due to the first watertight packing 112 and the second watertight packing 122.

The installation process of the second concrete block 120 will be described in more detail.

The second concrete block 120 is lowered from the upper side to the lower side so that the guide pole 180 installed in the first concrete block 110 is inserted into the second column through hole 121*b* of the second concrete block 120.

In this case, the upper insertion guide part 182 of the guide pole 180 is easily inserted into the second column through hole 121*b* of the second concrete block 120, and guides the seating position of the second concrete block 120.

This process is described in more detail in Korean Patent No. 10-2022339 "CONSTRUCTION METHOD FOR UNDERWATER CONCRETE BLOCK STRUCTURE" (registered on Sep. 10, 2019), which is incorporated by reference in the present specification, so a detailed description thereof will be omitted.

As illustrated in FIG. 28, the plurality of second concrete blocks 120 are installed in multiple layers on the top of the first concrete block 110, or in another embodiment, one second concrete block 120 may be installed in one layer on the top of the first concrete block 110.

Accordingly, in the concrete block assembly 100A formed by the installation of the second concrete blocks 120, the concrete-column through hole 150 having a closed lower end is formed.

The concrete-column through hole 150 is formed by the second column through holes 121*b* of the second concrete blocks 120 and the first concrete block 110.

In the concrete block assembly 100A, the first watertight packing 112 is located between the first concrete block body 111 and the second concrete block body 121 and prevents water from being introduced into the concrete-column through hole 150 from the outside, and the second watertight packing 122 is located between the second concrete block bodies 121 disposed vertically and prevents water from being introduced into the concrete-column through hole 150 from the outside.

That is, in the concrete block assembly 100A, although water exists in the concrete-column through hole 150, there is no water inside the guide pole 180, but there is water only in space outside the guide pole 180. Furthermore, external water cannot be introduced into the concrete-column through hole 150 due to the first watertight packing 112 and the second watertight packing 122.

(6) Column Drainage Step

Figure 29:
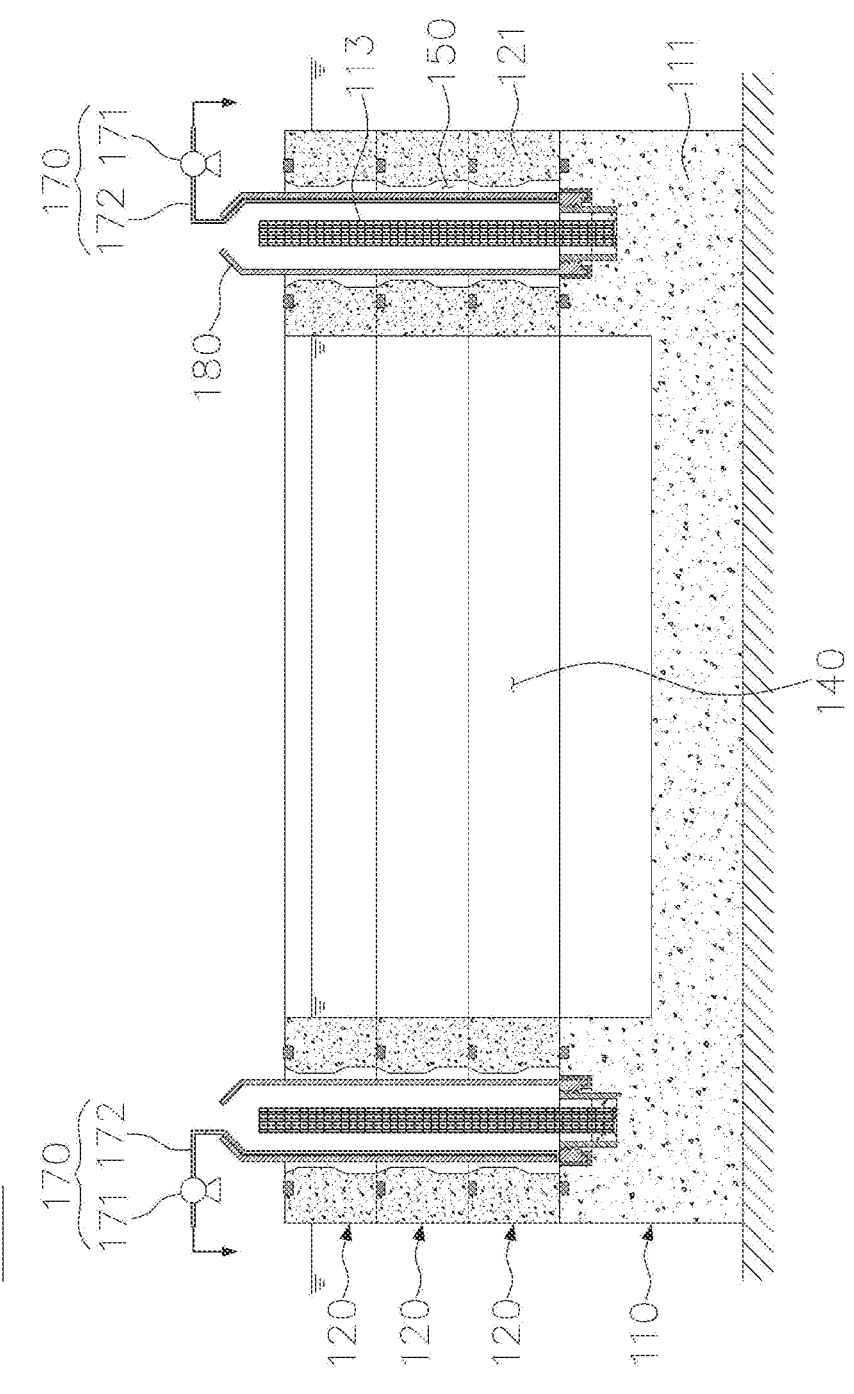

After the second concrete block installation step, as illustrated in FIG. 29, a column drainage step is performed to remove water inside the concrete-column through hole 150.

To this end, the drainage device 170 including the drain pump 171 and the drain hose 172 is connected to the upper end of the drain pipe 185, and due to the operation of the drain pump 171, the water contained inside the concrete-column through hole 150 is discharged through the drain pipe 185 and the drainage device 170 to the outside.

Meanwhile, water cannot flow into the concrete-column through hole 150 from the outside due to the first watertight packing 112 and the second watertight packing 122, and thus due to this step, the concrete-column through hole 150 becomes dry.

In this embodiment, inside the concrete-column through hole 150, only the water in space outside the guide pole 180 is drained, so draining time is greatly reduced.

Depending on an embodiment, there may be a case in which the guide pole 180 is not used. In this case, there is the inconvenience of inserting the drain hose up to the lower part of the concrete-column through hole 150, and further, since the inside of the concrete-column through hole 150 is full of water, it takes a relatively long time to drain the water.

(8) Guide Pole Removal Step

Figure 30:
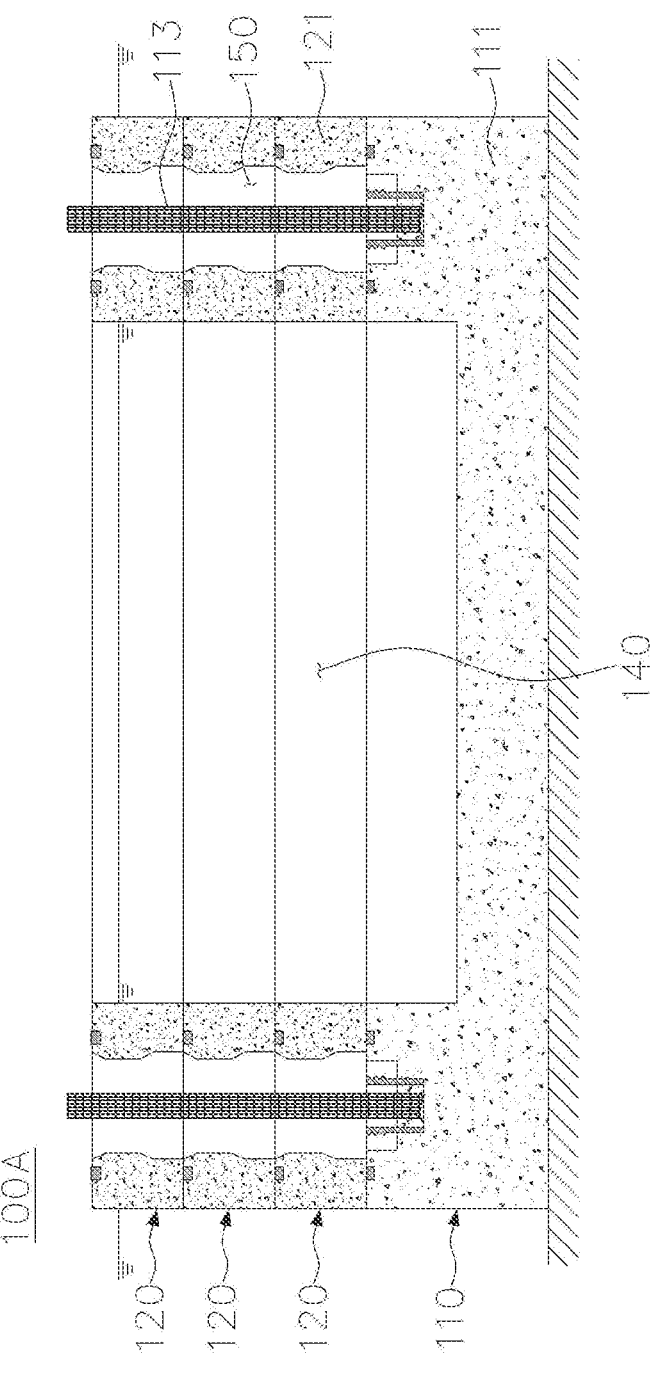

After the column drainage step, as illustrated in FIG. 30, a guide pole removal step is preformed to remove the guide pole 180.

The guide pole 180 is rotated so that the screw coupling of the pipe-side coupler 183 to the block-side coupler 114 is released, and the guide pole 180 is moved upward so that the guide pole 180 is removed.

(9) Concrete Column Formation Step

Figure 31:
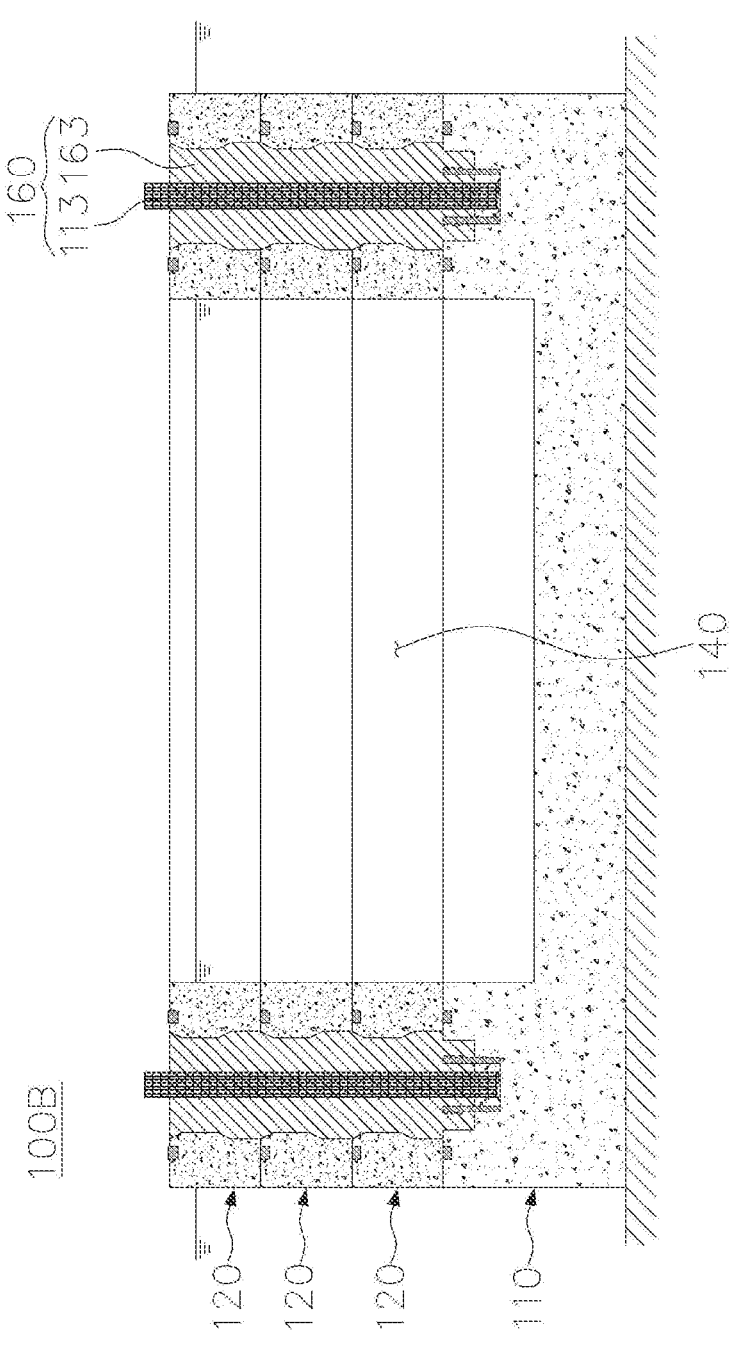

After the guide pole removal step, as illustrated in FIG. 31, the fresh concrete 163 is poured into each of the concrete-column through hole 150, and the concrete columns 160 each of which is formed such that the column rebar assembly 113 and the poured fresh concrete 163 are integrated with each other are formed in the concrete-column through hole 150.

In this case, there is no water in the concrete-column through hole 150, and there is no risk of leakage of the fresh concrete 163 to the outside due to the first watertight packing 112 and the second watertight packing 122, and thus a separate waterproof membrane is not required.

That is, the pouring of the fresh concrete 163 can be performed in the same environment as on land.

Meanwhile, the upper end part of the column rebar assembly 113 does not form the concrete column 160 and protrudes from the top of the concrete column 160.

That is, the column rebar assembly 113 of the first concrete block 110 has a length to pass through the concrete-column through hole 150 and protrudes from the top of the concrete-column through hole 150.

(10) Cap Concrete Formation Step

Figure 32:
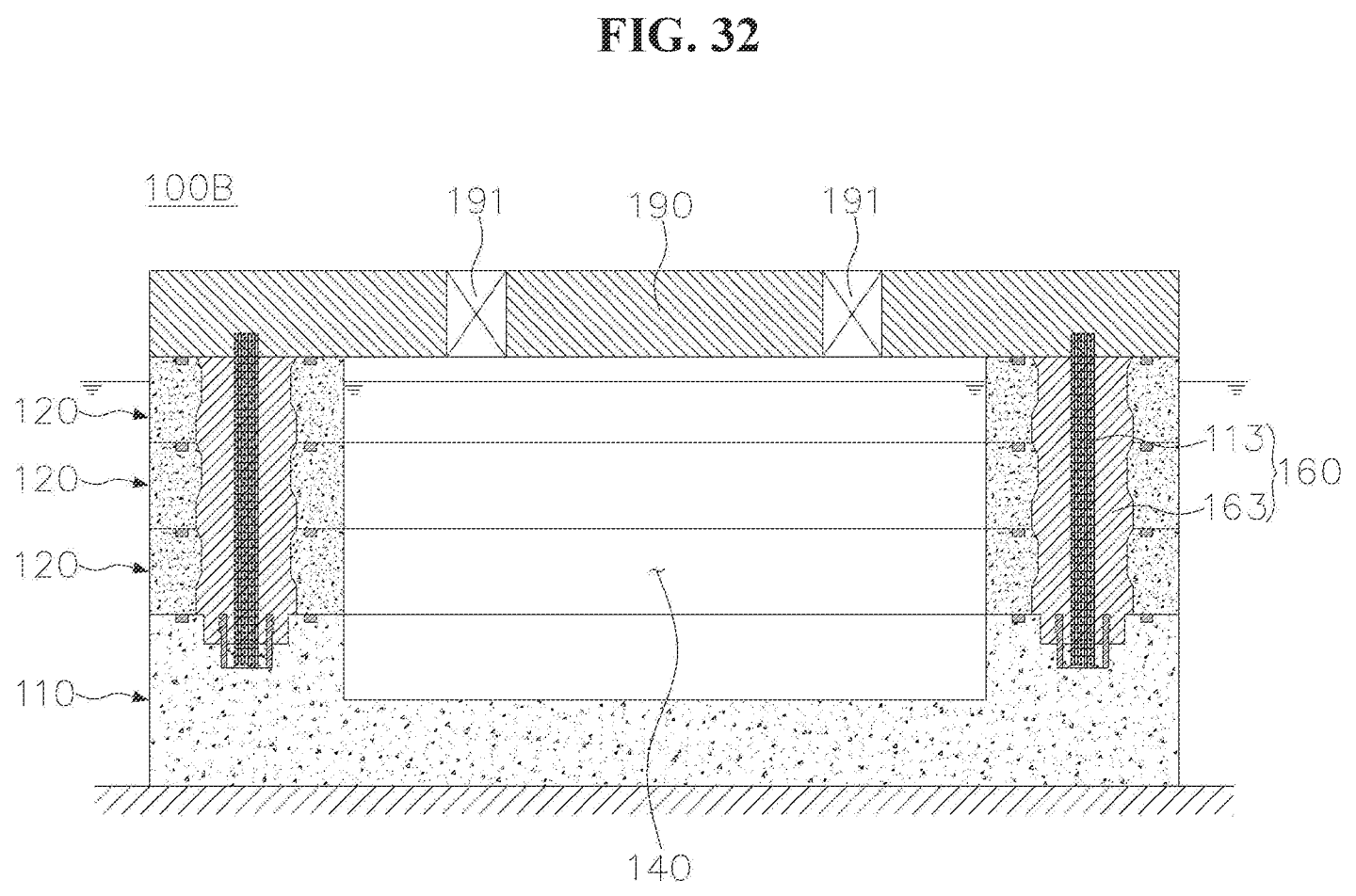

After the concrete column formation step, as illustrated in FIG. 32, the cap concrete 190 is formed on the top of the concrete block assembly 100A and thus the concrete block structure 100B is completed.

In this case, the upper end part of the column rebar assembly 113 which protrudes upward from the upper surface of the concrete-column through hole 150 is connected to the inner reinforcing bar of the cap concrete 190.

The cap concrete 190 covers the top of the assembly buoyancy chamber 140.

That is, in the concrete block structure 100B, the assembly buoyancy chamber 140 is enclosed by the second buoyancy chamber 121a of each of the second concrete blocks 120, the buoyancy-chamber bottom surface 111a of the first concrete block 110, and the cap concrete 190.

Meanwhile, the cap concrete 190 has working holes 191 formed therein for draining of the assembly buoyancy chamber 140.

(11) Assembly Buoyancy Chamber Drainage Step

Figure 33:
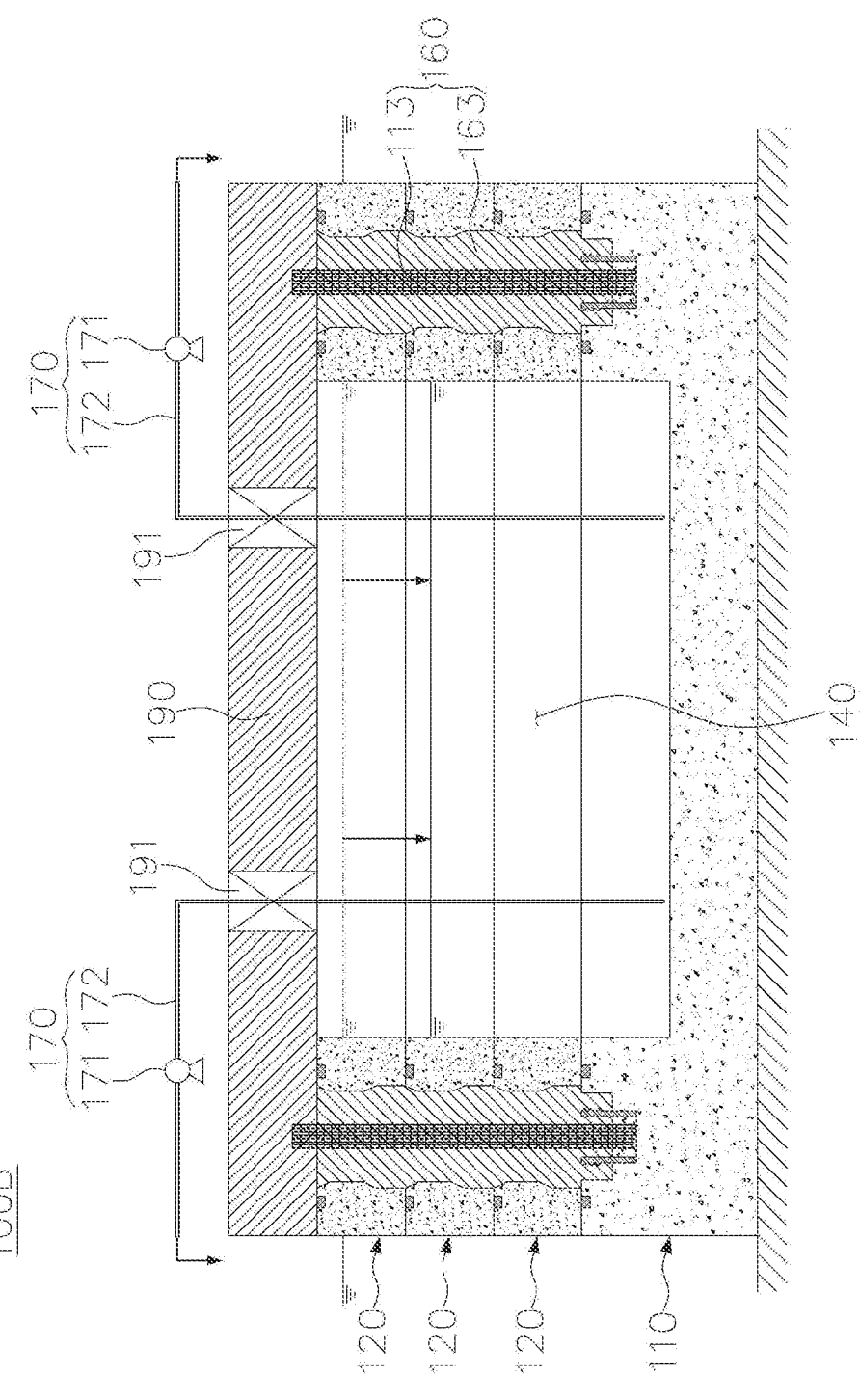

After the cap concrete formation step, as illustrated in FIG. 33, the assembly buoyancy chamber drainage step is performed to remove water inside the assembly buoyancy chamber 140.

The drainage device 170 including the drain pump 171 and the drain hose 172 is provided in the concrete block structure 100B, and the water contained inside the assembly buoyancy chamber 140 is discharged through the drainage device 170 to the outside by the operation of the drain pump 171.

Meanwhile, water cannot flow into the assembly buoyancy chamber 140 from the outside due to the first watertight packing 112 and the second watertight packing 122, and, due to this step, the assembly buoyancy chamber 140 becomes dry.

Figure 34:
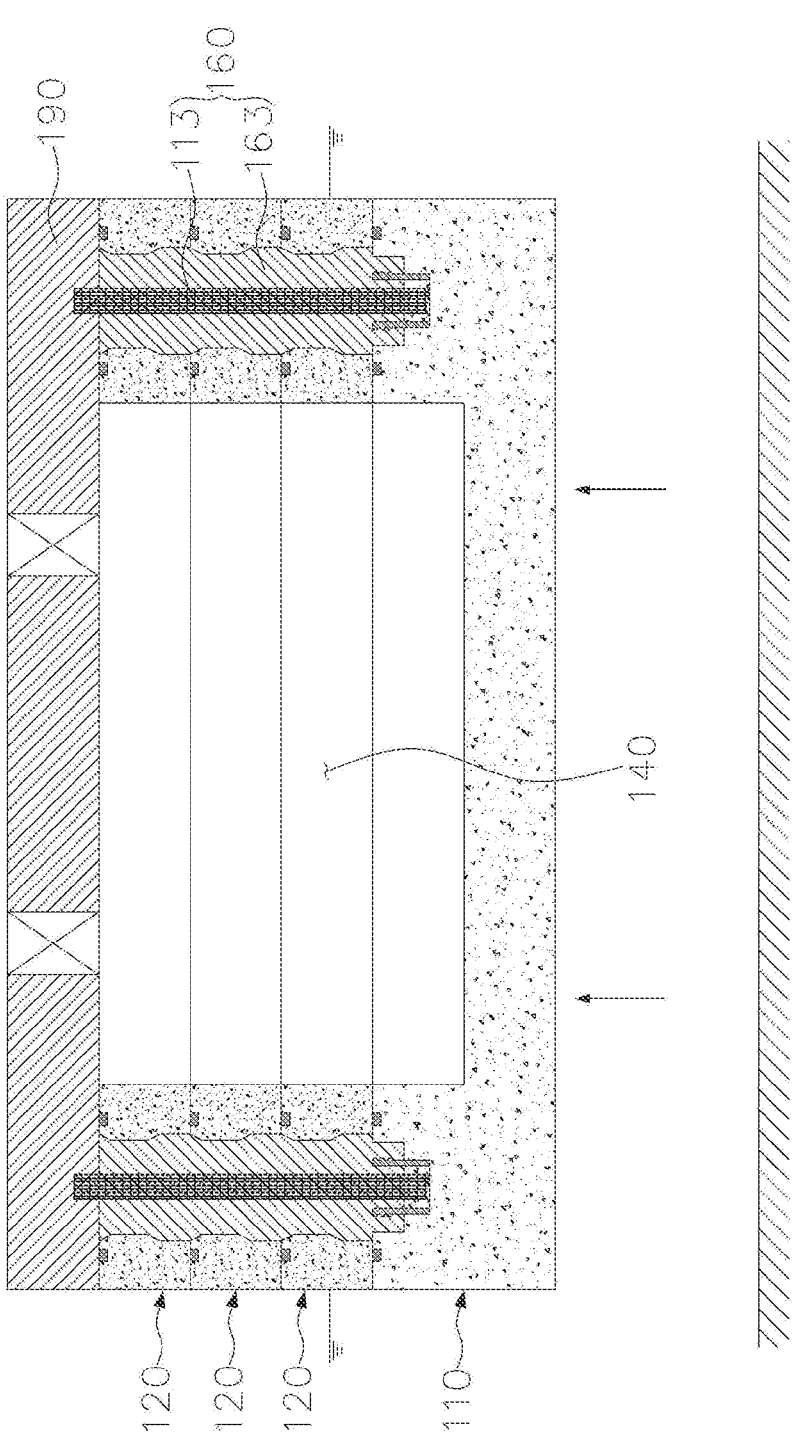

When the water inside the assembly buoyancy chamber 140 is drained in this way, as illustrated in FIG. 34, the concrete block structure 100B floats to a water surface due to the buoyancy of the assembly buoyancy chamber 140.

In the underwater concrete block structure 100B manufactured as described above, the lower end part of the column rebar assembly 113 is connected to the first concrete block 110, and the upper end part of the column rebar assembly 113 is connected to the cap concrete 190, so the concrete block structure 100B has a very firm structure.

That is, the concrete column 160, the first concrete block 110, and the cap concrete 190 may be integrally formed by the column rebar assembly 113.

Next, a method of manufacturing a floatable concrete block structure according to a third embodiment of the present disclosure will be described.

Figure 35:
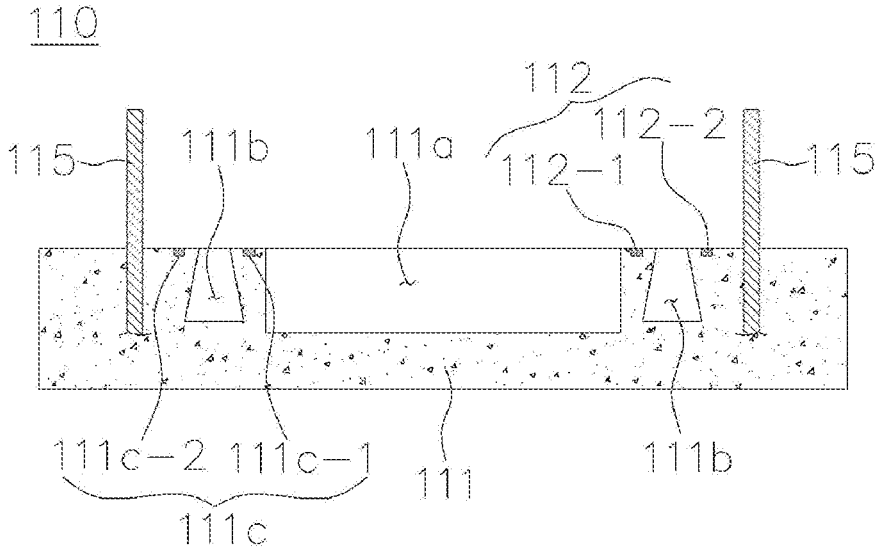
FIG. 35 is a conceptual sectional view of a first concrete block used in a floatable concrete block structure according to a third embodiment of the present disclosure.
Figure 36:
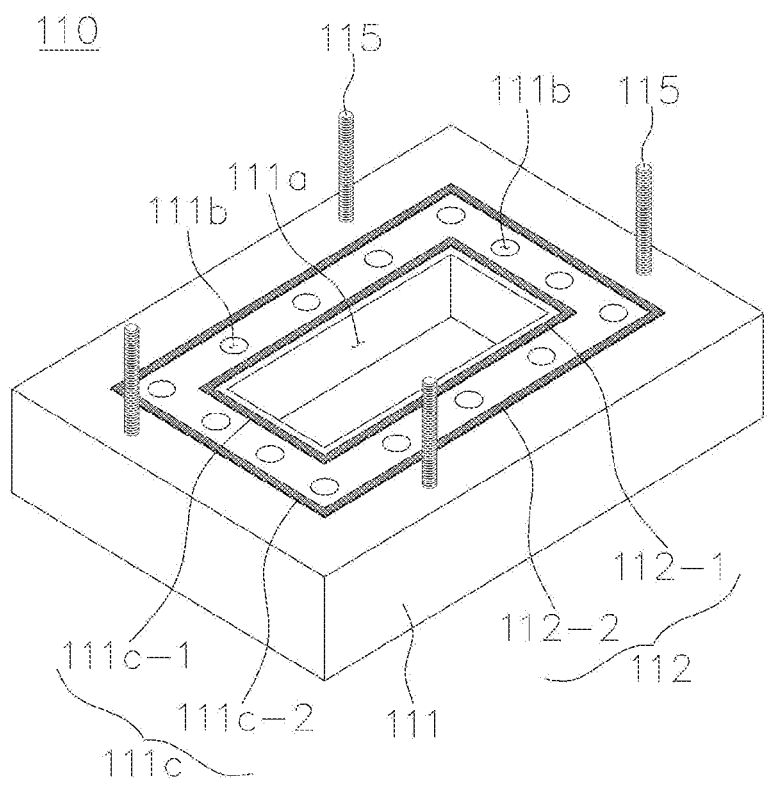
FIG. 36 is a conceptual perspective view of FIG. 35.
Figure 37:
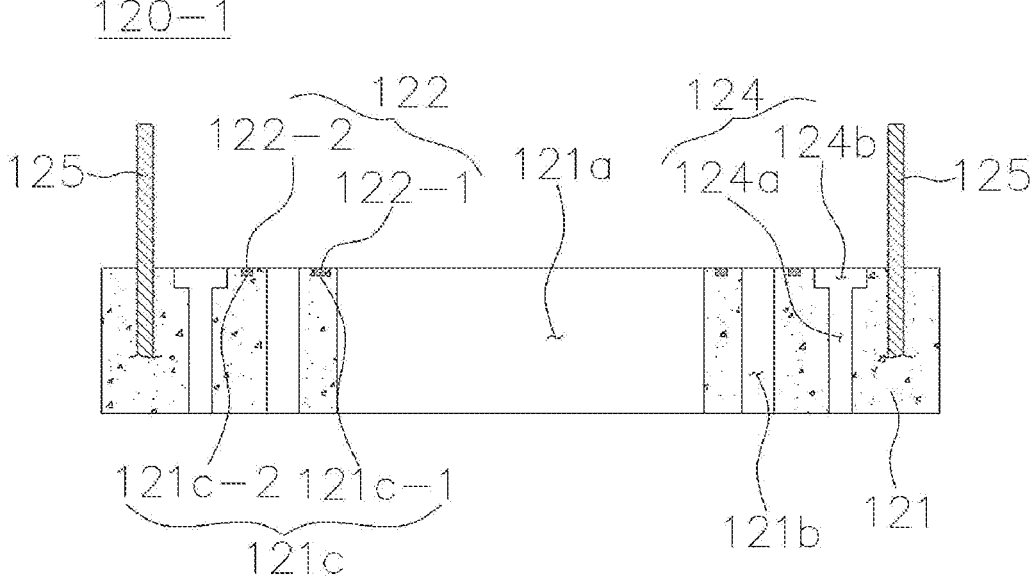
FIG. 37 is a conceptual sectional view of a second concrete block used in the floatable concrete block structure according to the third embodiment of the present disclosure.
Figure 38:
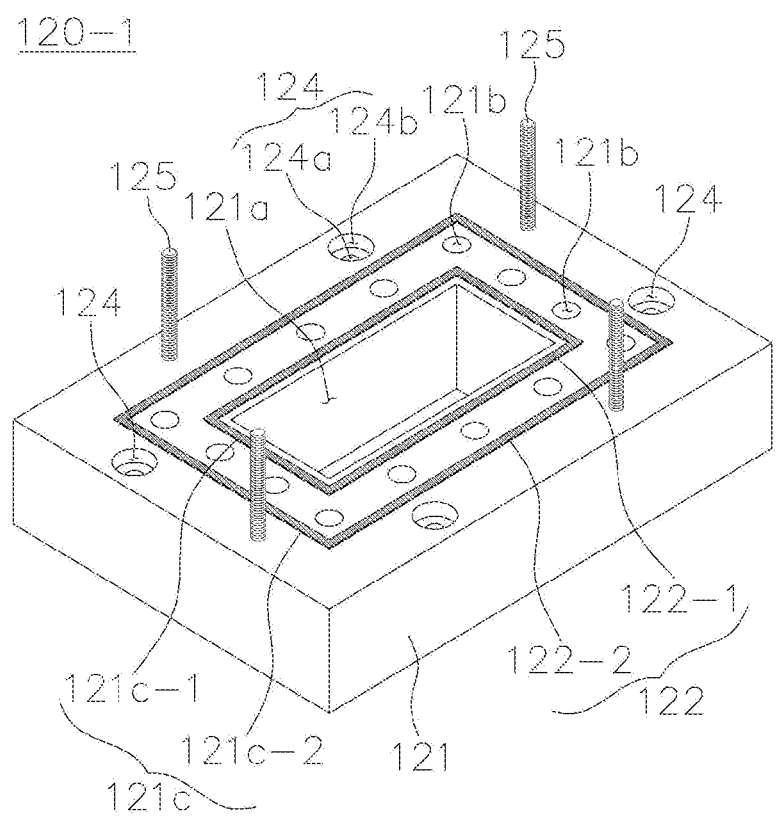
FIG. 38 is a conceptual perspective view of FIG. 37.
Figure 39:
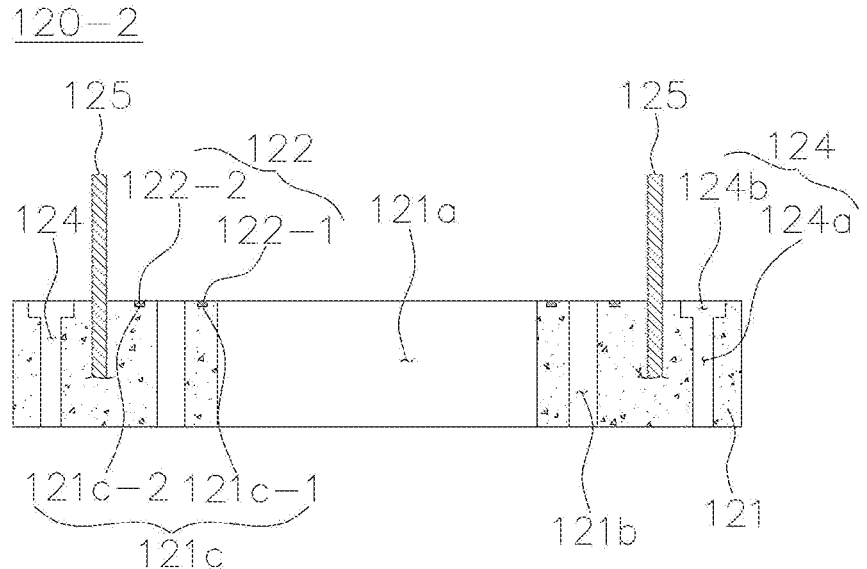
FIG. 39 is a conceptual sectional view of another second concrete block used in the floatable concrete block structure according to the third embodiment of the present disclosure.
Figure 40:
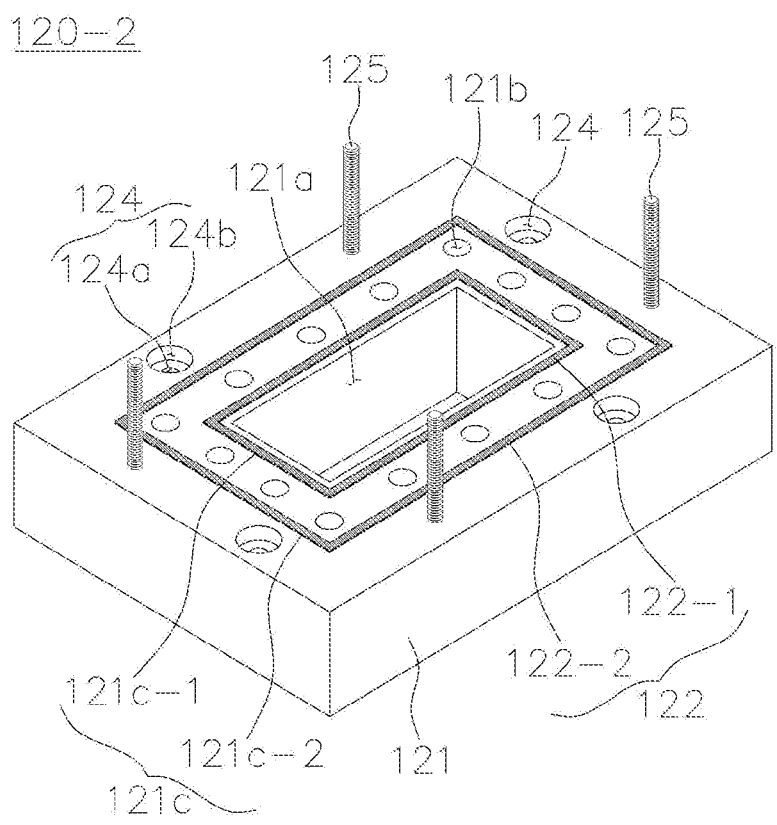
FIG. 40 is a conceptual perspective view of FIG. 39.
Figure 41:
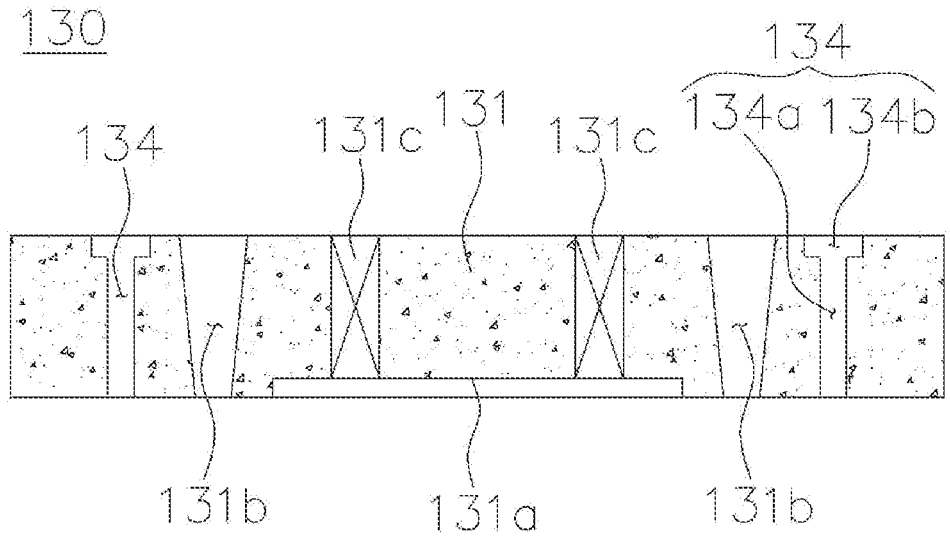
FIG. 41 is a conceptual sectional view of a third concrete block used in the floatable concrete block structure according to the third embodiment of the present disclosure.
Figure 42:
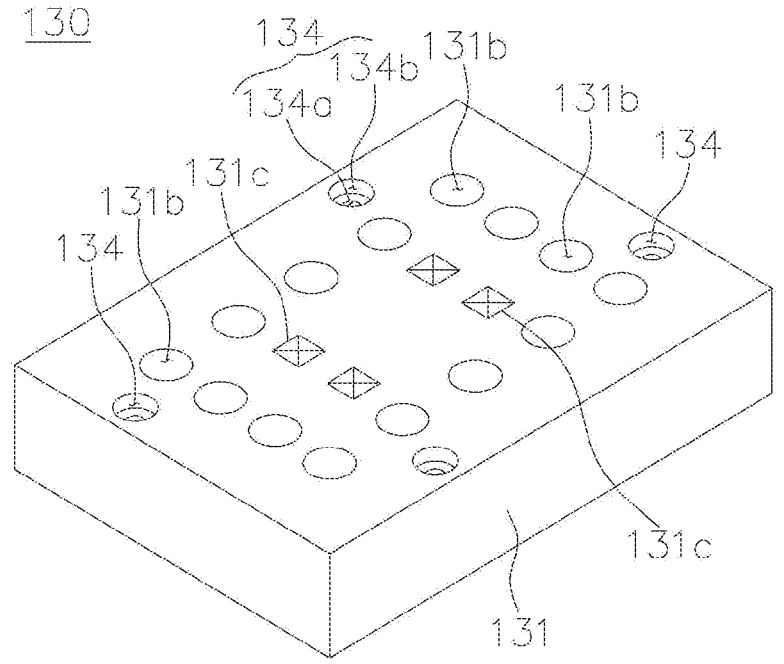
FIG. 42 is a conceptual perspective view of FIG. 41.

FIG. 35 is a conceptual sectional view of a first concrete block used in the floatable concrete block structure according to the third embodiment of the present disclosure, FIG. 36 is a conceptual perspective view of FIG. 35, FIG. 37 is a conceptual sectional view of a second concrete block used in the floatable concrete block structure according to the third embodiment of the present disclosure, FIG. 38 is a conceptual perspective view of FIG. 37, FIG. 39 is a conceptual sectional view of another second concrete block used in the floatable concrete block structure according to the third embodiment of the present disclosure, FIG. 40 is a conceptual perspective view of FIG. 39, FIG. 41 is a conceptual sectional view of a third concrete block used in the floatable concrete block structure according to the third embodiment of the present disclosure, FIG. 42 is a conceptual perspective view of FIG. 41, FIGS. 43 to 47 are views sequentially illustrating the method of manufacturing a floatable concrete block structure according to the third embodiment of the present disclosure.

(1) First Concrete Block Fabrication Step

In this embodiment, as illustrated in FIGS. 35 and 36, the first concrete block 110 is fabricated.

The first concrete block 110 includes the first concrete block body 111 having a cuboid shape.

The first buoyancy chamber 111a is formed in the first concrete block body 111.

The plurality of first column space parts 111b are formed on the top of the first concrete block body 111 along the edge of the first buoyancy chamber 111a.

In this embodiment, the first column space part 111b is a recess having the shape of a truncated cone with an open upper part.

In this embodiment, the first packing grooves 111c are categorized into a first inner packing groove 111c-1 and a first outer packing groove 111c-2, and the first watertight packings 112 are categorized into the first inner watertight packing 112-1 and the first outer watertight packing 112-2.

The first inner packing groove 111c-1 and the first inner watertight packing 112-1 surround the first buoyancy chamber 111a inside the first column space parts 111b, and the first outer packing groove 111c-2 and the first outer watertight packing 112-2 surround the first buoyancy chamber 111a and the first inner watertight packing 112-1 outside the first inner packing groove 111c-1, the first inner watertight packing 112-1, and the first column space parts 111b.

Each of the first inner watertight packings 112-1 and the first outer watertight packings 112-2 has a shape of a quadrangular ring surrounding the first buoyancy chamber 111a.

In the first concrete block body 111, a plurality of first temporary coupling bolts 115 are provided in a form surrounding the first buoyancy chamber 111a.

Each of the first temporary coupling bolts 115 extends vertically upward from a lower end part of the first temporary coupling bolt 115 connected to the inside of the first concrete block body 111 and protrudes upward from the upper surface of the first concrete block body 111.

In FIGS. 1 and 2, the first buoyancy chamber 111a is illustrated to be excessively small for convenience of understanding (to illustrate other components to be sufficiently large), and the size of the first buoyancy chamber 111a is large enough to allow the first concrete block 110 to float on the surface of water.

(2) Second Concrete Block Fabrication Step

In this embodiment, the second concrete blocks 120 are fabricated. In this embodiment, the second concrete blocks are categorized into a second concrete block-1 120-1 as illustrated in FIGS. 37 and 38, and a second concrete block-2 120-2 as illustrated in FIGS. 39 and 40.

Each of the second concrete blocks 120-1 and 120-2 includes the second concrete block body 121 having a cuboid shape.

The second buoyancy chamber 121a is formed in the second concrete block body 121.

Like the first concrete block 110, the second packing grooves 121c are categorized into a second inner packing groove 121c-1 and a second outer packing groove 121c-2, and the second watertight packings 122 are categorized into a second inner watertight packing 122-1 and a second outer watertight packing 122-2.

In the second concrete block body 121, a plurality of second temporary coupling bolts 125 are provided in a form surrounding the second buoyancy chamber 121a.

Each of the second temporary coupling bolts 125 extends vertically upward from a lower end part of the second temporary coupling bolt 125 connected to the inside of the second concrete block body 121 and protrudes upward from the upper surface of the second concrete block body 121.

Meanwhile, in the second concrete block body 121, a plurality of second bolt connection spaces 124 are formed in a form surrounding the second buoyancy chamber 121a.

Each of the second bolt connection spaces 124 includes a second bolt through hole 124a extending vertically in the second concrete block body 121, and a second nut seating recess 124b which is formed on the second bolt through hole 124a and has a cross-sectional area larger than the cross-sectional area of the second bolt through hole 124a.

The second temporary coupling bolts 125 and the second bolt connection spaces 124 illustrated in FIGS. 37 and 38 are conceptually illustrated for convenience of understanding.

In addition, as illustrated in FIGS. 38 and 40, the second concrete block-1 120-1 and the second concrete block-2 120-2 differ from each other only in the arrangement of the second temporary coupling bolts 125 and the second bolt connection spaces 124, and the rest is equal to each other.

(3) Third Concrete Block Fabrication Step

In this embodiment, as illustrated in FIGS. 41 and 42, the third concrete block 130 is fabricated.

The third concrete block 130 includes a third concrete block body 131 having a cuboid shape.

In the third concrete block body 131, a plurality of third bolt connection spaces 134 are formed in a form surrounding the buoyancy chamber ceiling surface 131a.

Each of the third bolt connection spaces 134 includes a third bolt through hole 134a extending vertically in the third concrete block body 131, and a third nut seating recess 134b which is formed on the third bolt through hole 134a and has a cross-sectional area larger than the cross-sectional area of the third bolt through hole 134a.

(4) First Concrete Block Flotation Step

Figure 43:
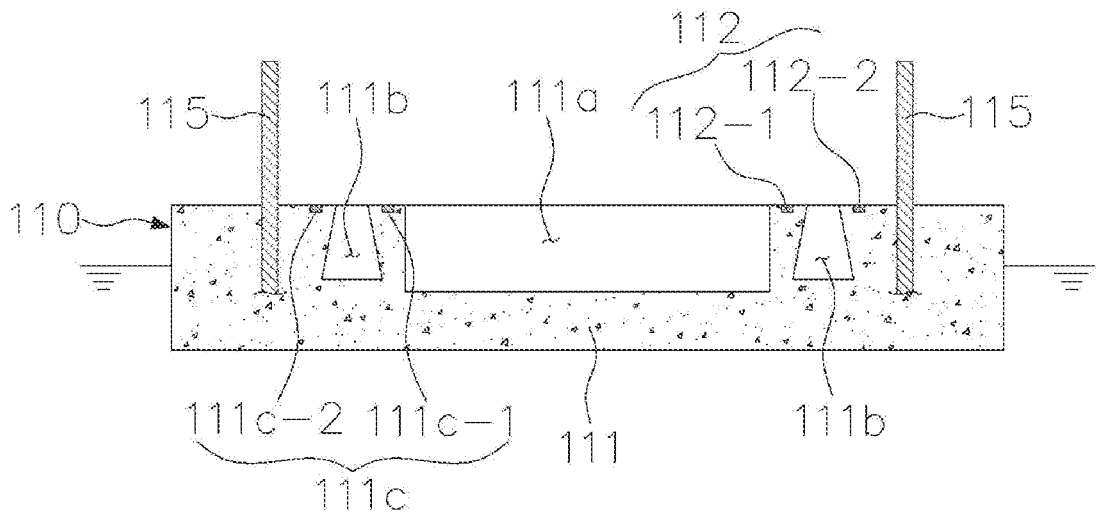
FIGS. 43 to 47 are views sequentially illustrating the method of manufacturing a floatable concrete block structure according to the third embodiment of the present disclosure.

After the first concrete block fabrication step, the first concrete block 110 is floated on a water surface as illustrated in FIG. 43.

In this case, the first concrete block 110 is floated on the water surface by the buoyancy of the first buoyancy chamber 111a.

Usually, after the first concrete block 110 is fabricated on land, the first concrete block 110 is installed to float on a water surface as illustrated in FIG. 43.

In some cases, an auxiliary buoyancy member (not shown) may be combined with the first concrete block 110 to increase buoyancy thereof.

(5) Second Concrete Block Installation Step

Figure 44:
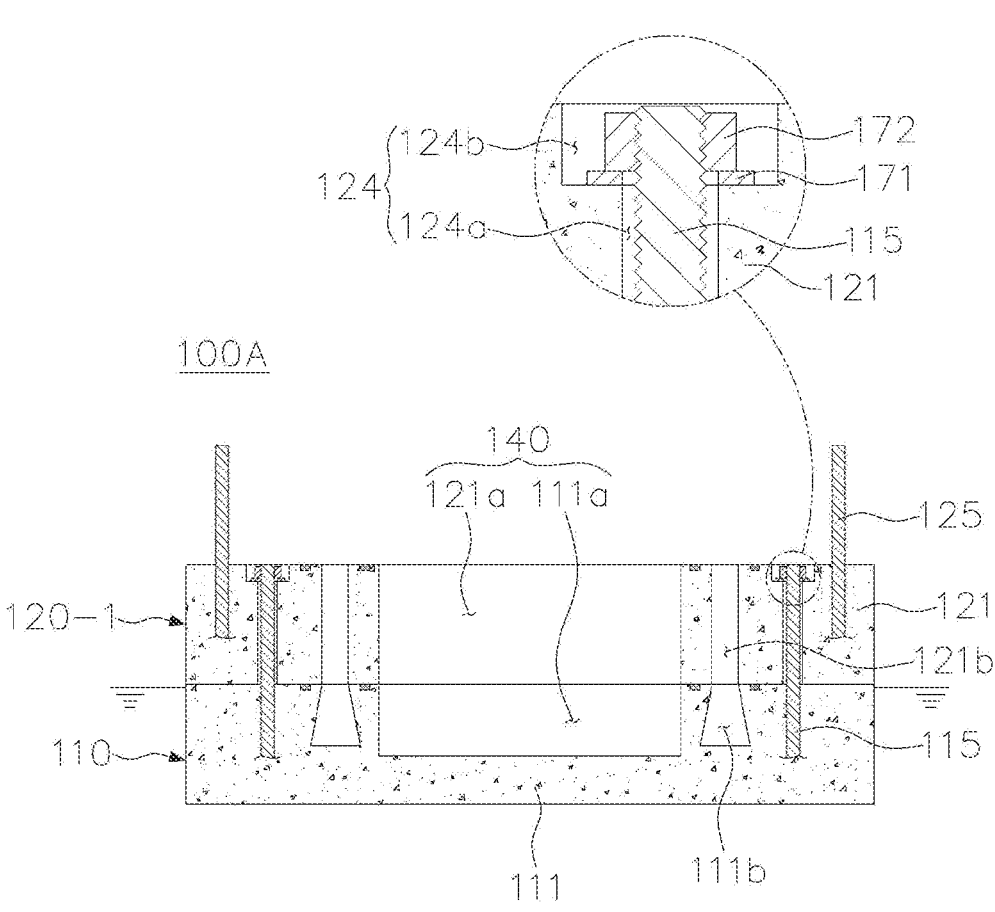
Figure 45:
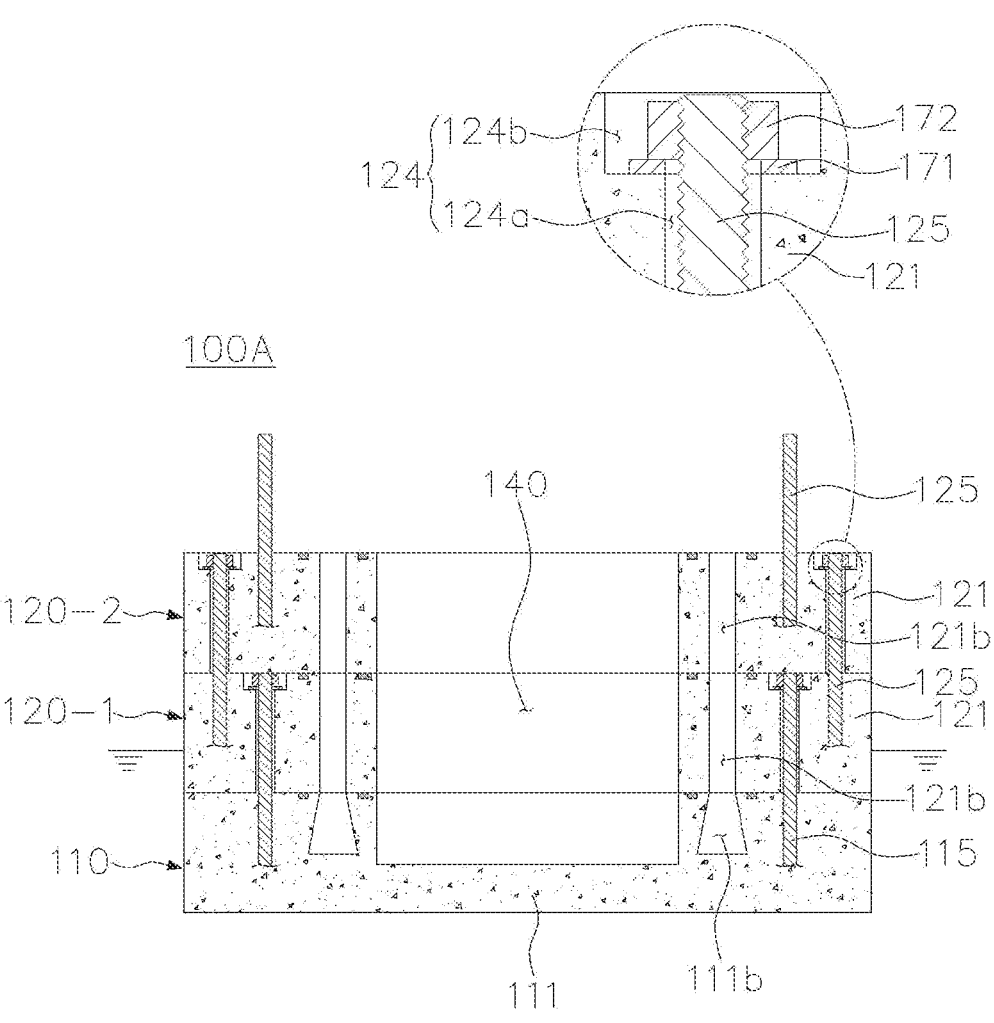

After the second concrete block fabrication step and the first concrete block flotation step, as illustrated in FIGS. 44 and 45, the second concrete block-1 120-1 and the second concrete block-2 120-2 are installed on the first concrete block 110 floating on a water surface to form the concrete block assembly 100A.

Accordingly, in the concrete block assembly 100A formed according to the installation of the second concrete blocks 120-1 and 120-2, the second buoyancy chamber 121a of the second concrete block-1 120-1, the second buoyancy chamber 121a of the second concrete block-2 120-2, and the first buoyancy chamber 111a of the first concrete block 110 communicate with each other and form the assembly buoyancy chamber 140 having a closed lower end.

In FIGS. 44 and 45, the upper surface of the assembly buoyancy chamber 140 is open.

In the concrete block assembly 100A, the second watertight packing 122 is located between the second concrete block body 121 and the second concrete block body 121 and prevents water from being introduced into the assembly buoyancy chamber 140 from the outside.

Particularly, in FIG. 45, although the first concrete block body 111 is located below a water surface, the first watertight packing 112 prevents water from being introduced into the assembly buoyancy chamber 140 from the outside, allowing the concrete block assembly 100A to float.

However, in the concrete block assembly 100A, the first concrete block body 111 and the second concrete block body 121 are not completely coupled to each other, and thus water may be introduced into a gap between the first concrete block body 111 and the second concrete block body 121 when it receives a large impact from the outside.

In order to prevent this problem, it is preferable that the first concrete block body 111 and the second concrete block body 121 are temporarily coupled to each other, and the second concrete block body 121 and the second concrete block body 121 are temporarily coupled to each other.

Description with reference to FIG. 44 will be made.

After installation of the second concrete block-1 120-1 while the first temporary coupling bolt 115 of the first concrete block 110 is inserted into the second bolt connection space 124 of the second concrete block-1 120-1, a nut 172 is fastened to the first temporary coupling bolt 115 while a washer 171 is mounted on the upper end part of the first temporary coupling bolt 115. The fastened nut 172 and the washer 171 are located in the second nut seating recess 124b.

Accordingly, the first concrete block body 111 and the second concrete block body 121 are temporarily coupled to each other.

This temporary coupling is sufficient to withstand external impact during the manufacturing process of the concrete block structure of the present disclosure.

Likewise, in FIG. 45, the second concrete block-1 120-1 and the second concrete block-2 120-2 are temporarily coupled to each other by the second temporary coupling bolt 12, the washer 171, and the nut 172.

(6) Third Concrete Block Installation Step

Figure 46:
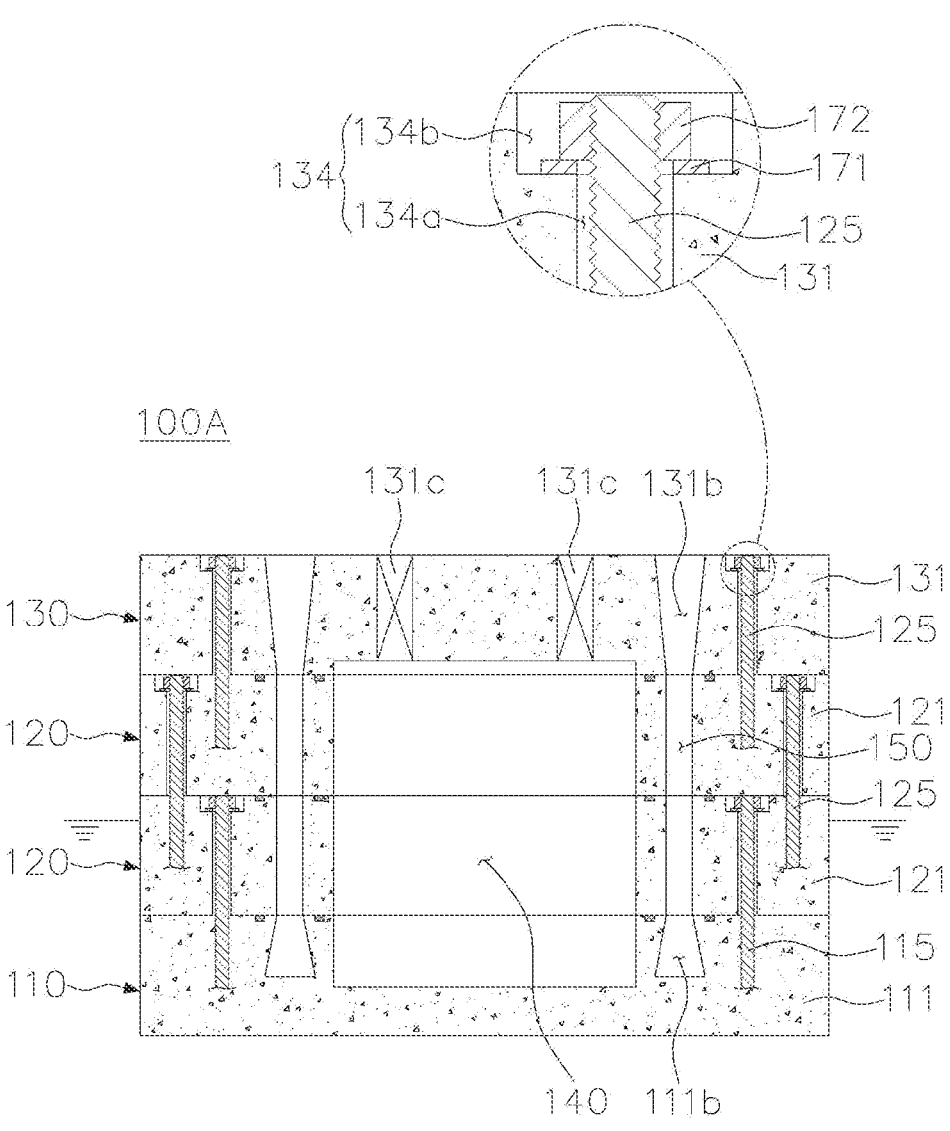

After the third concrete block fabrication step and the second concrete block installation step, as illustrated in FIG. 46, the third concrete block 130 is installed on the second concrete block-2 120-2 to complete the form of the concrete block assembly 100A.

In the completed concrete block assembly 100A, the assembly buoyancy chamber 140 has upper and lower ends closed by the second buoyancy chamber 121a of each of the second concrete blocks 120-1 and 120-2, the first buoyancy chamber 111a of the first concrete block 110, and the buoyancy chamber ceiling surface 131a of the third concrete block 130.

In addition, the first column space part 111b of the first concrete block 110, the second column through hole 121b of each of the second concrete blocks 120-1 and 120-2, and the third column through hole 131b of the third concrete block 130 communicate with each other and form the concrete-column through hole 150.

Furthermore, the second temporary coupling bolt 125 is inserted into the third bolt connection space 134, and the washer 171 and the nut 172 are fastened to the upper end part of the second temporary coupling bolts 125, and thus the second concrete block-2 120-2 and the third concrete block 130 are temporarily coupled to each other.

(7) Concrete Column Formation Step

Figure 47:
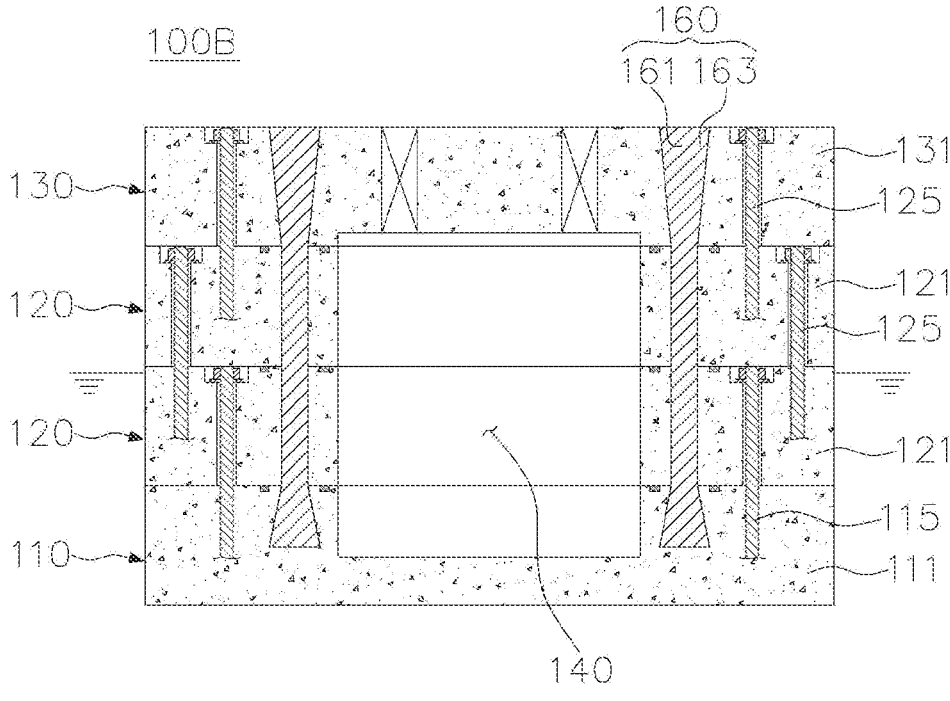

After the third concrete block installation step, as illustrated in FIG. 47, the concrete columns 160 are formed in the concrete-column through holes 150.

That is, the concrete column 160 is formed along the first column space part 111b of the first concrete block 110, the second column through hole 121b of each of the second concrete blocks 120-1 and 120-2, and the third column through hole 131b of the third concrete block 130 to form the concrete block structure 100B having the first concrete block 110, each of the second concrete blocks 120-1 and 120-2, and the third concrete block 130 coupled to each other by the concrete columns 160.

Meanwhile, since the concrete-column through hole 150 is located between the first inner watertight packing 112-1 and the first outer watertight packing 112-2, and between the second inner watertight packing 122-1 and the second outer watertight packing 122-2, the leakage of the fresh concrete 163 is prevented.

As illustrated in FIG. 47, since the first column space part 111b has the shape of a truncated cone, and the third column through hole 131b has the shape of an inverted truncated cone, the concrete column 160 has structure in which the first concrete block 110, each of the second concrete blocks 120-1 and 120-2, and the third concrete block 130 are clearly prohibited from being separated from each other.

When the concrete column 160 is formed, even under harsh marine conditions, the first, second, and third concrete blocks 110, 120, and 130 can be maintained to be coupled to each other by the concrete columns 160, and even if the first temporary coupling bolts 115 are corroded and damaged, the coupled state of the first, second, and third concrete blocks 110, 120, and 130 can be maintained.

The technique described in the second embodiment may be applied to the modified form of the third embodiment.

That is, a part in which the second embodiment is different from the first embodiment is applied to the third embodiment, so that the modified form of the third embodiment may be proposed.

For example, in the modified form of the third embodiment, the first concrete block may include a plurality of column rebar assemblies, each of which extends vertically upward from a lower end part thereof connected to the inside of the first concrete block body and protrudes upward from the upper surface of the first concrete block body.

Next, a fourth embodiment of the present disclosure will be described.

Figure 48:
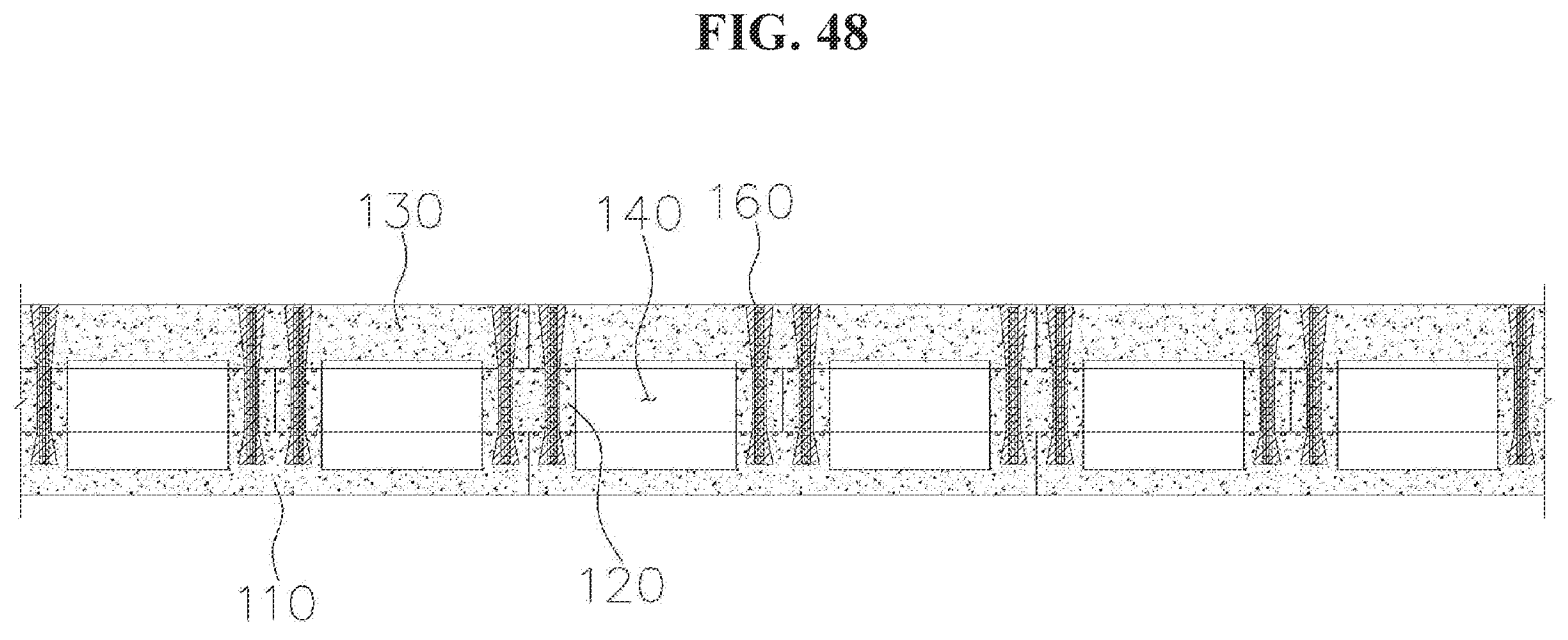
Figure 49:
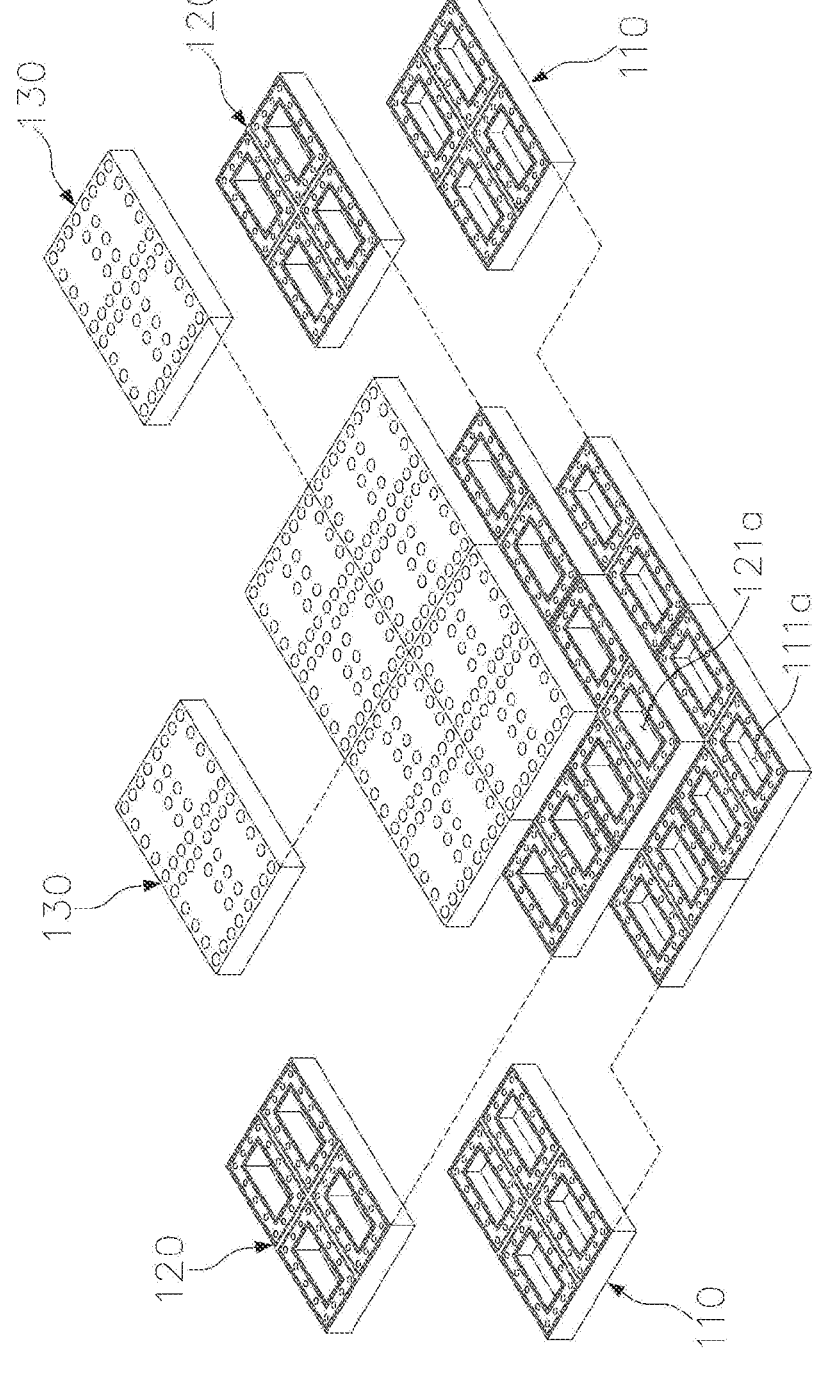
FIG. 49 is a conceptual perspective view illustrated by separating some of first concrete blocks, second concrete blocks, and third concrete blocks to show a form in which the first concrete blocks, the second concrete blocks, and the third concrete blocks used in FIG. 48 are stacked on each other.

FIG. 48 is a conceptual sectional view of a floatable concrete block structure according to the fourth embodiment of the present disclosure, and FIG. 49 is a conceptual perspective view illustrated by separating some of first concrete blocks, second concrete blocks, and third concrete blocks to show a form in which the first concrete blocks, the second concrete blocks, and the third concrete blocks used in FIG. 48 are stacked on each other.

The concrete block structure of FIG. 48 is floating on a water surface.

In FIG. 49, for the convenience of understanding, the concrete column 160 is not illustrated.

Each of the first concrete blocks 110 has four first buoyancy chambers 111a formed therein.

In addition, the plurality of first concrete blocks 110 float on a water surface to be continuously disposed in all directions in a horizontal direction (in front and rear and left and right directions).

Each of the second concrete blocks 120 also has four second buoyancy chambers 121a formed therein.

A plurality of second concrete blocks 120 are installed on the first concrete blocks 110 floating on the water surface. The second concrete blocks 120 also are continuously disposed in all directions in the horizontal direction.

In addition, each of the second concrete blocks 120 is located on the center of four first concrete blocks 110 adjacent to each other, and thus one second buoyancy chamber 121a of the second concrete block 120 communicates with a first buoyancy chamber 111a of any one of the four first concrete blocks 110, and another second buoyancy chamber 121*a* of the second concrete block 120 communicates with a first buoyancy chamber 111*a* of another of the four first concrete blocks 110.

Accordingly, there are multiple second concrete blocks 120 (four second concrete blocks in this embodiment) which are installed continuously in the horizontal direction on one first concrete block 110.

Furthermore, there are a plurality of third concrete blocks 130, and the plurality of third concrete blocks are installed on the second concrete block 120 floating on the water surface and are continuously disposed in the horizontal direction.

In addition, one third concrete block 130 is connected to four second concrete blocks 120 located under the one third concrete block 130.

After the first, second, and third concrete blocks 110, 120, and 130 are installed in this way, the concrete column 160 is formed.

This embodiment shows that the concrete block structure of the present disclosure may have a very wide structure in a horizontal direction.

Accordingly, the concrete block structure of the present disclosure has no special limitations in a vertical size and a horizontal size and such a very large structure can be easily manufactured.

Meanwhile, depending on an embodiment, the buoyancy control device (not shown) may be provided to control the buoyancy of the assembly buoyancy chamber 140.

The buoyancy control device may discharge water of the assembly buoyancy chamber 140 to the outside or introduce water into the assembly buoyancy chamber 140 to control the buoyancy of the assembly buoyancy chamber.

Accordingly, when the buoyancy of the assembly buoyancy chamber 140 is controlled, the concrete block structure of the present disclosure may float to a water surface or sink underwater like a submarine.

In some cases, a tube for buoyancy assistance for having more buoyancy may be mounted to the concrete block structure of the present disclosure, and further, in some cases, a propulsion device may be mounted to the concrete block structure of the present disclosure so that the concrete block structure of the present disclosure can move on a water surface by itself.

As described above, the concrete block structure of the present disclosure can be manufactured without using a large barge or by using a large barge for a very short period of time, so the manufacturing cost thereof is very economical.

In addition, concrete blocks that constitute the concrete block structure can be transported on land, and the installation work thereof is simplified, thereby reducing an overall construction cost.

Furthermore, in the cases of the first embodiment and the second embodiment, since most of the manufacturing work of the concrete block structure is performed underwater, work at height is unnecessary, so it is possible to work in a relatively safe environment.

The above description of the present disclosure is only for illustrative purposes, and those skilled in the art will appreciate that various modifications are possible without departing from the scope and spirit of the present disclosure. Therefore, it should be understood that the embodiments described above are illustrative in all respects and not limiting. For example, each component described as a single type may be implemented in a distributed manner, and similarly, components described as being distributed may also be implemented in a combined form.

The scope of the present disclosure is indicated by the claims to be described later rather than the detailed description, and it should be interpreted that all changes or modified forms derived from the meaning and scope of the claims and concept equivalent thereto are included in the scope of the present disclosure.

The floatable concrete block structure according to the present disclosure may be used for a variety of purposes, such as a floating breakwater, a platform for wind/tidal power generation, and a replacement for a general large caisson.

The invention claimed is:

1. A method of manufacturing a floatable concrete block structure, the method comprising:

a first concrete block fabrication step of fabricating a first concrete block comprising a first concrete block body in which a buoyancy-chamber bottom surface is formed on an upper surface thereof, and a first watertight packing disposed on the upper surface of the first concrete block body in a form surrounding the buoyancy-chamber bottom surface, wherein the first concrete block further comprises a plurality of column rebar assemblies, each of which extends vertically from the first concrete block body and protrudes upward from the upper surface of the first concrete block body;

a second concrete block fabrication step of fabricating a second concrete block comprising a second concrete block body in which a second buoyancy chamber having an open lower surface and a plurality of first column through holes extending vertically are formed;

a first concrete block installation step of installing the first concrete block by submerging the first concrete block in water after the first concrete block fabrication step;

a second concrete block installation step of installing the second concrete block such that a concrete block assembly is formed by installing the second concrete block on the first concrete block after the second concrete block fabrication step and the first concrete block installation step, an assembly buoyancy chamber having a closed lower end is formed in the concrete block assembly by the second buoyancy chamber of the second concrete block and the buoyancy-chamber bottom surface of the first concrete block, and the first watertight packing is located between the first concrete block and the second concrete block and prevents water from being introduced into the assembly buoyancy chamber from the outside, wherein the second concrete block is installed on the first concrete block such that each of the column rebar assemblies of the first concrete block is inserted into each of the first column through holes of the second concrete block, and concrete-column through holes each having a closed lower end are formed in the concrete block assembly by the first column through holes of the second concrete block being covered by the upper surface of the first concrete block body;

a column drainage step of removing water contained inside the concrete-column through holes in which the column rebar assemblies are inserted after the second concrete block installation step;

a concrete column formation step of forming concrete columns coupling the first concrete block and the second concrete block to each other along each of the first column through holes after the second concrete block installation step so as to form a concrete block structure having the first concrete block and the second concrete block coupled to each other by the concrete columns, wherein by pouring concrete into the concrete-column through holes after the column drainage step, the concrete columns having the column rebar assemblies and the poured concrete integrated with each other are formed; and an assembly buoyancy chamber drainage step of draining water contained in the assembly buoyancy chamber after the concrete column formation step so that the concrete block structure is floated to a water surface by the buoyancy of the assembly buoyancy chamber.

2. The method of claim 1, wherein the second buoyancy chamber extends vertically and has open upper and lower surfaces;

a third concrete block fabrication step of fabricating a third concrete block comprising a third concrete block body which has a plurality of second column through holes extending vertically and has a buoyancy chamber ceiling surface formed on a lower surface of the third concrete block body so as to cover an upper side of the assembly buoyancy chamber;

a third concrete block installation step of installing the third concrete block on the second concrete block after the second concrete block installation step and the third concrete block fabrication step is comprised; and at the concrete column formation step, the concrete column is formed along the first column through hole and the second column through hole so as to form the concrete block structure having the first concrete block, the second concrete block, and the third concrete block coupled to each other by the concrete columns.

3. The method of claim 1, wherein the second buoyancy chamber extends vertically and has open upper and lower surfaces; and a cap concrete formation step of forming a cap concrete on the second concrete block so as to cover an upper side of the assembly buoyancy chamber after the concrete column formation step is comprised.

4. The method of claim 1, wherein the second concrete block is provided with a second watertight packing disposed on an upper surface of the second concrete block body in a form surrounding the second buoyancy chamber; and at the second concrete block installation step, a plurality of second concrete blocks are installed in multiple layers on the first concrete block, and the second watertight packing is located between the second concrete blocks installed to be vertically adjacent to each other so that water is prevented from being introduced into the assembly buoyancy chamber from the outside.

* * * * *